US008947493B2

(12) United States Patent
Lian et al.

(10) Patent No.: US 8,947,493 B2
(45) Date of Patent: Feb. 3, 2015

(54) SYSTEM AND METHOD FOR ALERTING A PARTICIPANT IN A VIDEO CONFERENCE

(75) Inventors: TiongHu Lian, Cupertino, CA (US); Senthil K. Kanniappan, San Jose, CA (US); Jane L. Nguyen, Santa Clara, CA (US); Tanu Aggarwal, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 450 days.

(21) Appl. No.: 13/298,022

(22) Filed: Nov. 16, 2011

(65) Prior Publication Data
US 2013/0120522 A1 May 16, 2013

(51) Int. Cl.
H04N 7/14 (2006.01)
H04N 7/15 (2006.01)

(52) U.S. Cl.
CPC ...................................... *H04N 7/15* (2013.01)
USPC ...................................................... 348/14.08

(58) Field of Classification Search
CPC ......... H04N 7/15; H04N 7/147; H04N 7/148; H04N 7/152; H04L 65/4046; H04L 12/1822
USPC ........................................... 348/14.08–14.09
See application file for complete search history.

(56) References Cited

U.S. PATENT DOCUMENTS

| 2,911,462 | A | 11/1959 | Brady |
| D212,798 | S | 11/1968 | Dreyfuss |
| 3,793,489 | A | 2/1974 | Sank |
| 3,909,121 | A | 9/1975 | De Mesquita Cardoso |
| 4,400,724 | A | 8/1983 | Fields |
| 4,473,285 | A | 9/1984 | Winter |
| 4,494,144 | A | 1/1985 | Brown |
| 4,750,123 | A | 6/1988 | Christian |
| 4,815,132 | A | 3/1989 | Minami |
| 4,827,253 | A | 5/1989 | Maltz |
| 4,853,764 | A | 8/1989 | Sutter |
| 4,890,314 | A | 12/1989 | Judd et al. |
| 4,961,211 | A | 10/1990 | Tsugane et al. |
| 4,994,912 | A | 2/1991 | Lumelsky et al. |

(Continued)

FOREIGN PATENT DOCUMENTS

| CN | 101953158 A | 1/2011 |
| CN | 102067593 | 5/2011 |

(Continued)

OTHER PUBLICATIONS

U.S. Appl. No. 13/098,430, filed Apr. 30, 2011, entitled "System and Method for Transferring Transparency Information in a Video Environment," Inventors: Eddie Collins et al.
Active8-3D—Holographic Projection—3D Hologram Retail Display & Video Project, [retrieved and printed on Feb. 24, 2009], http://www.activ8-3d.co.uk/3d_holocubes; 1 page.

(Continued)

Primary Examiner — Mohammad Islam
(74) Attorney, Agent, or Firm — Patent Capital Group

(57) ABSTRACT

An example method is provided and includes identifying an active speaker of a video session; analyzing a signal from an originating endpoint associated with the active speaker; identifying a target participant with whom the active speaker seeks to interact; and providing a notification to the target participant that alerts the target participant that the active speaker is seeking to interact with the target participant. In more particular embodiments, the identifying of the target participant includes detecting a gaze of the active speaker; and identifying a target screen to which the gaze is directed.

20 Claims, 4 Drawing Sheets

(56) References Cited

U.S. PATENT DOCUMENTS

| | | |
|---|---|---|
| 5,003,532 A | 3/1991 | Ashida et al. |
| 5,020,098 A | 5/1991 | Celli |
| 5,136,652 A | 8/1992 | Jibbe et al. |
| 5,187,571 A | 2/1993 | Braun et al. |
| 5,200,818 A | 4/1993 | Neta et al. |
| 5,249,035 A | 9/1993 | Yamanaka |
| 5,255,211 A | 10/1993 | Redmond |
| D341,848 S | 11/1993 | Bigelow et al. |
| 5,268,734 A | 12/1993 | Parker et al. |
| 5,317,405 A | 5/1994 | Kuriki et al. |
| 5,337,363 A | 8/1994 | Platt |
| 5,347,363 A | 9/1994 | Yamanaka |
| 5,351,067 A | 9/1994 | Lumelsky et al. |
| 5,359,362 A | 10/1994 | Lewis et al. |
| D357,468 S | 4/1995 | Rodd |
| 5,406,326 A | 4/1995 | Mowry |
| 5,423,554 A | 6/1995 | Davis |
| 5,446,834 A | 8/1995 | Deering |
| 5,448,287 A | 9/1995 | Hull |
| 5,467,401 A | 11/1995 | Nagamitsu et al. |
| 5,495,576 A | 2/1996 | Ritchey |
| 5,502,481 A | 3/1996 | Dentinger et al. |
| 5,502,726 A | 3/1996 | Fischer |
| 5,506,604 A | 4/1996 | Nally et al. |
| 5,532,737 A | 7/1996 | Braun |
| 5,541,639 A | 7/1996 | Takatsuki et al. |
| 5,541,773 A | 7/1996 | Kamo et al. |
| 5,570,372 A | 10/1996 | Shaffer |
| 5,572,248 A | 11/1996 | Allen et al. |
| 5,587,726 A | 12/1996 | Moffat |
| 5,612,733 A | 3/1997 | Flohr |
| 5,625,410 A | 4/1997 | Washino et al. |
| 5,666,153 A | 9/1997 | Copeland |
| 5,673,401 A | 9/1997 | Volk et al. |
| 5,675,374 A | 10/1997 | Kohda |
| 5,715,377 A | 2/1998 | Fukushima et al. |
| D391,935 S | 3/1998 | Sakaguchi et al. |
| D392,269 S | 3/1998 | Mason et al. |
| 5,729,471 A | 3/1998 | Jain et al. |
| 5,737,011 A | 4/1998 | Lukacs |
| 5,748,121 A | 5/1998 | Romriell |
| 5,760,826 A | 6/1998 | Nayar |
| 5,790,182 A | 8/1998 | Hilaire |
| 5,796,724 A | 8/1998 | Rajamani et al. |
| 5,815,196 A | 9/1998 | Alshawi |
| 5,818,514 A | 10/1998 | Duttweiler et al. |
| 5,821,985 A | 10/1998 | Iizawa |
| 5,889,499 A | 3/1999 | Nally et al. |
| 5,894,321 A | 4/1999 | Downs et al. |
| D410,447 S | 6/1999 | Chang |
| 5,940,118 A | 8/1999 | Van Schyndel |
| 5,940,530 A | 8/1999 | Fukushima et al. |
| 5,953,052 A | 9/1999 | McNelley et al. |
| 5,956,100 A | 9/1999 | Gorski |
| 6,069,658 A | 5/2000 | Watanabe |
| 6,088,045 A | 7/2000 | Lumelsky et al. |
| 6,097,441 A | 8/2000 | Allport |
| 6,101,113 A | 8/2000 | Paice |
| 6,124,896 A | 9/2000 | Kurashige |
| 6,148,092 A | 11/2000 | Qian |
| 6,167,162 A | 12/2000 | Jacquin et al. |
| 6,172,703 B1 | 1/2001 | Lee |
| 6,173,069 B1 | 1/2001 | Daly et al. |
| 6,226,035 B1 | 5/2001 | Korein et al. |
| 6,243,130 B1 | 6/2001 | McNelley et al. |
| 6,249,318 B1 | 6/2001 | Girod et al. |
| 6,256,400 B1 | 7/2001 | Takata et al. |
| 6,266,082 B1 | 7/2001 | Yonezawa et al. |
| 6,266,098 B1 | 7/2001 | Cove et al. |
| 6,285,392 B1 | 9/2001 | Satoda et al. |
| 6,292,575 B1 | 9/2001 | Bortolussi et al. |
| 6,356,589 B1 | 3/2002 | Gebler et al. |
| 6,380,539 B1 | 4/2002 | Edgar |
| 6,424,377 B1 | 7/2002 | Driscoll, Jr. |
| 6,430,222 B1 | 8/2002 | Okadia |
| 6,459,451 B2 | 10/2002 | Driscoll et al. |
| 6,462,767 B1 | 10/2002 | Obata et al. |
| 6,493,032 B1 | 12/2002 | Wallerstein et al. |
| 6,507,356 B1 | 1/2003 | Jackel et al. |
| 6,573,904 B1 | 6/2003 | Chun et al. |
| 6,577,333 B2 | 6/2003 | Tai et al. |
| 6,583,808 B2 | 6/2003 | Boulanger et al. |
| 6,590,603 B2 | 7/2003 | Sheldon et al. |
| 6,591,314 B1 | 7/2003 | Colbath |
| 6,593,955 B1 | 7/2003 | Falcon |
| 6,593,956 B1 | 7/2003 | Potts et al. |
| 6,611,281 B2 | 8/2003 | Strubbe |
| 6,680,856 B2 | 1/2004 | Schreiber |
| 6,693,663 B1 | 2/2004 | Harris |
| 6,694,094 B2 | 2/2004 | Partynski et al. |
| 6,704,048 B1 | 3/2004 | Malkin et al. |
| 6,710,797 B1 | 3/2004 | McNelley et al. |
| 6,751,106 B2 | 6/2004 | Zhang et al. |
| D492,692 S | 7/2004 | Fallon et al. |
| 6,763,226 B1 | 7/2004 | McZeal |
| 6,768,722 B1 | 7/2004 | Katseff et al. |
| 6,774,927 B1 | 8/2004 | Cohen et al. |
| 6,795,108 B2 | 9/2004 | Jarboe et al. |
| 6,795,558 B2 | 9/2004 | Matsuo et al. |
| 6,798,834 B1 | 9/2004 | Murakami et al. |
| 6,806,898 B1 | 10/2004 | Toyama et al. |
| 6,807,280 B1 | 10/2004 | Stroud et al. |
| 6,831,653 B2 | 12/2004 | Kehlet et al. |
| 6,844,990 B2 | 1/2005 | Artonne et al. |
| 6,853,398 B2 | 2/2005 | Malzbender et al. |
| 6,867,798 B1 | 3/2005 | Wada et al. |
| 6,882,358 B1 | 4/2005 | Schuster et al. |
| 6,888,358 B2 | 5/2005 | Lechner et al. |
| 6,909,438 B1 | 6/2005 | White et al. |
| 6,911,995 B2 | 6/2005 | Ivanov et al. |
| 6,917,271 B2 | 7/2005 | Zhang et al. |
| 6,922,718 B2 | 7/2005 | Chang |
| 6,963,653 B1 | 11/2005 | Miles |
| 6,980,526 B2 | 12/2005 | Jang et al. |
| 6,989,754 B2 | 1/2006 | Kiscanin et al. |
| 6,989,836 B2 | 1/2006 | Ramsey |
| 6,989,856 B2 | 1/2006 | Firestone et al. |
| 6,990,086 B1 | 1/2006 | Holur et al. |
| 7,002,973 B2 | 2/2006 | MeLampy et al. |
| 7,023,855 B2 | 4/2006 | Haumont et al. |
| 7,028,092 B2 | 4/2006 | MeLampy et al. |
| 7,031,311 B2 | 4/2006 | MeLampy et al. |
| 7,043,528 B2 | 5/2006 | Schmitt et al. |
| 7,046,862 B2 | 5/2006 | Ishizaka et al. |
| 7,057,636 B1 | 6/2006 | Cohen-Solal et al. |
| 7,057,662 B2 | 6/2006 | Malzbender |
| 7,061,896 B2 | 6/2006 | Jabbari et al. |
| 7,072,504 B2 | 7/2006 | Miyano et al. |
| 7,072,833 B2 | 7/2006 | Rajan |
| 7,080,157 B2 | 7/2006 | McCanne |
| 7,092,002 B2 | 8/2006 | Ferren et al. |
| 7,111,045 B2 | 9/2006 | Kato et al. |
| 7,126,627 B1 | 10/2006 | Lewis et al. |
| 7,131,135 B1 | 10/2006 | Virag et al. |
| 7,136,651 B2 | 11/2006 | Kalavade |
| 7,139,767 B1 | 11/2006 | Taylor et al. |
| D533,525 S | 12/2006 | Arie |
| D533,852 S | 12/2006 | Ma |
| D534,511 S | 1/2007 | Maeda et al. |
| D535,954 S | 1/2007 | Hwang et al. |
| 7,158,674 B2 | 1/2007 | Suh |
| 7,161,942 B2 | 1/2007 | Chen et al. |
| D539,243 S | 3/2007 | Chiu et al. |
| 7,197,008 B1 | 3/2007 | Shabtay et al. |
| D541,773 S | 5/2007 | Chong et al. |
| D542,247 S | 5/2007 | Kinoshita et al. |
| 7,221,260 B2 | 5/2007 | Berezowski et al. |
| D545,314 S | 6/2007 | Kim |
| 7,239,338 B2 | 7/2007 | Krisbergh et al. |
| 7,246,118 B2 | 7/2007 | Chastain et al. |
| D550,635 S | 9/2007 | DeMaio et al. |
| D551,184 S | 9/2007 | Kanou et al. |
| 7,269,292 B2 | 9/2007 | Steinberg |
| 7,274,555 B2 | 9/2007 | Kim et al. |

(56) References Cited

U.S. PATENT DOCUMENTS

| | | | |
|---|---|---|---|
| D555,610 S | 11/2007 | Yang et al. | |
| D559,265 S | 1/2008 | Armstrong et al. | |
| D560,681 S | 1/2008 | Fletcher | |
| D561,130 S | 2/2008 | Won et al. | |
| 7,336,299 B2 | 2/2008 | Kostrzewski et al. | |
| D567,202 S | 4/2008 | Rieu Piquet | |
| 7,352,809 B2 | 4/2008 | Wenger et al. | |
| 7,353,279 B2 | 4/2008 | Durvasula et al. | |
| 7,359,731 B2 | 4/2008 | Choksi | |
| 7,399,095 B2 | 7/2008 | Rondinelli | |
| 7,411,975 B1 | 8/2008 | Mohaban | |
| 7,413,150 B1 | 8/2008 | Hsu | |
| 7,428,000 B2 | 9/2008 | Cutler et al. | |
| D578,496 S | 10/2008 | Leonard | |
| 7,440,615 B2 | 10/2008 | Gong et al. | |
| 7,450,134 B2 | 11/2008 | Maynard et al. | |
| 7,471,320 B2 | 12/2008 | Malkin et al. | |
| 7,477,657 B1 | 1/2009 | Murphy et al. | |
| D588,560 S | 3/2009 | Mellingen et al. | |
| 7,505,036 B1 | 3/2009 | Baldwin | |
| 7,518,051 B2 | 4/2009 | Redmann | |
| D592,621 S | 5/2009 | Han | |
| 7,529,425 B2 | 5/2009 | Kitamura et al. | |
| 7,532,230 B2 | 5/2009 | Culbertson et al. | |
| 7,532,232 B2 | 5/2009 | Shah et al. | |
| 7,534,056 B2 | 5/2009 | Cross et al. | |
| 7,545,761 B1 | 6/2009 | Kalbag | |
| 7,551,432 B1 | 6/2009 | Bockheim et al. | |
| 7,555,141 B2 | 6/2009 | Mori | |
| 7,575,537 B2 | 8/2009 | Ellis | |
| 7,577,246 B2 | 8/2009 | Idan et al. | |
| D602,453 S | 10/2009 | Ding et al. | |
| 7,616,226 B2 | 11/2009 | Roessler et al. | |
| 7,646,419 B2 | 1/2010 | Cernasov | |
| D610,560 S | 2/2010 | Chen | |
| 7,679,639 B2 | 3/2010 | Harrell et al. | |
| 7,692,680 B2 | 4/2010 | Graham | |
| 7,707,247 B2 | 4/2010 | Dunn et al. | |
| D615,514 S | 5/2010 | Mellingen et al. | |
| 7,710,448 B2 | 5/2010 | De Beer et al. | |
| 7,710,450 B2 | 5/2010 | Dhuey et al. | |
| 7,714,222 B2 | 5/2010 | Taub et al. | |
| 7,715,657 B2 | 5/2010 | Lin et al. | |
| 7,719,605 B2 | 5/2010 | Hirasawa et al. | |
| 7,719,662 B2 | 5/2010 | Bamji et al. | |
| 7,720,277 B2 | 5/2010 | Hattori | |
| 7,725,919 B1 | 5/2010 | Thiagarajan et al. | |
| D626,102 S | 10/2010 | Buzzard et al. | |
| D626,103 S | 10/2010 | Buzzard et al. | |
| D628,175 S | 11/2010 | Desai et al. | |
| 7,839,434 B2 | 11/2010 | Ciudad et al. | |
| D628,968 S | 12/2010 | Desai et al. | |
| 7,855,726 B2 | 12/2010 | Ferren et al. | |
| 7,861,189 B2 | 12/2010 | Watanabe et al. | |
| 7,889,851 B2 | 2/2011 | Shah et al. | |
| 7,894,531 B1 | 2/2011 | Cetin et al. | |
| D635,569 S | 4/2011 | Park, II | |
| D635,975 S | 4/2011 | Seo et al. | |
| D636,359 S | 4/2011 | Buzzard et al. | |
| D636,747 S | 4/2011 | Buzzard et al. | |
| D637,568 S | 5/2011 | Desai et al. | |
| D637,569 S | 5/2011 | Desai et al. | |
| D637,570 S | 5/2011 | Desai et al. | |
| 7,939,959 B2 | 5/2011 | Wagoner | |
| 7,990,422 B2 | 8/2011 | Ahiska et al. | |
| 8,000,559 B2 | 8/2011 | Kwon | |
| 8,077,857 B1 | 12/2011 | Lambert | |
| 8,081,346 B1 | 12/2011 | Anup et al. | |
| 8,086,076 B2 | 12/2011 | Tian et al. | |
| 8,135,068 B1 | 3/2012 | Alvarez | |
| 8,179,419 B2 | 5/2012 | Girish et al. | |
| 8,219,404 B2 | 7/2012 | Weinberg et al. | |
| 8,259,155 B2 | 9/2012 | Marathe et al. | |
| D669,086 S | 10/2012 | Boyer et al. | |
| D669,088 S | 10/2012 | Boyer et al. | |
| 8,299,979 B2 | 10/2012 | Rambo et al. | |
| 8,315,466 B2 | 11/2012 | El-Maleh et al. | |
| 8,363,719 B2 | 1/2013 | Nakayama | |
| 8,436,888 B1 | 5/2013 | Baldino et al. | |
| 8,614,735 B2 * | 12/2013 | Buckler | 348/14.08 |
| 2002/0047892 A1 | 4/2002 | Gonsalves | |
| 2002/0106120 A1 | 8/2002 | Brandenburg et al. | |
| 2002/0108125 A1 | 8/2002 | Joao | |
| 2002/0114392 A1 | 8/2002 | Sekiguchi et al. | |
| 2002/0118890 A1 | 8/2002 | Rondinelli | |
| 2002/0131608 A1 | 9/2002 | Lobb et al. | |
| 2002/0140804 A1 | 10/2002 | Colmenarez et al. | |
| 2002/0149672 A1 | 10/2002 | Clapp et al. | |
| 2002/0186528 A1 | 12/2002 | Huang | |
| 2002/0196737 A1 | 12/2002 | Bullard | |
| 2003/0017872 A1 | 1/2003 | Oishi et al. | |
| 2003/0048218 A1 | 3/2003 | Milnes et al. | |
| 2003/0071932 A1 | 4/2003 | Tanigaki | |
| 2003/0072460 A1 | 4/2003 | Gonopolskiy et al. | |
| 2003/0160861 A1 | 8/2003 | Barlow et al. | |
| 2003/0179285 A1 | 9/2003 | Naito | |
| 2003/0185303 A1 | 10/2003 | Hall | |
| 2003/0197687 A1 | 10/2003 | Shetter | |
| 2003/0220971 A1 * | 11/2003 | Kressin | 709/204 |
| 2004/0003411 A1 | 1/2004 | Nakai et al. | |
| 2004/0032906 A1 | 2/2004 | Lillig | |
| 2004/0038169 A1 | 2/2004 | Mandelkern et al. | |
| 2004/0061787 A1 | 4/2004 | Liu et al. | |
| 2004/0091232 A1 | 5/2004 | Appling, III | |
| 2004/0118984 A1 | 6/2004 | Kim et al. | |
| 2004/0119814 A1 | 6/2004 | Clisham et al. | |
| 2004/0164858 A1 | 8/2004 | Lin | |
| 2004/0165060 A1 | 8/2004 | McNelley et al. | |
| 2004/0178955 A1 | 9/2004 | Menache et al. | |
| 2004/0189463 A1 | 9/2004 | Wathen | |
| 2004/0189676 A1 | 9/2004 | Dischert | |
| 2004/0196250 A1 | 10/2004 | Mehrotra et al. | |
| 2004/0207718 A1 | 10/2004 | Boyden et al. | |
| 2004/0218755 A1 | 11/2004 | Marton et al. | |
| 2004/0246962 A1 | 12/2004 | Kopeikin et al. | |
| 2004/0246972 A1 | 12/2004 | Wang et al. | |
| 2004/0254982 A1 | 12/2004 | Hoffman et al. | |
| 2004/0260796 A1 | 12/2004 | Sundqvist et al. | |
| 2005/0007954 A1 | 1/2005 | Sreemanthula et al. | |
| 2005/0024484 A1 | 2/2005 | Leonard | |
| 2005/0050246 A1 | 3/2005 | Lakkakorpi et al. | |
| 2005/0081160 A1 | 4/2005 | Wee et al. | |
| 2005/0110867 A1 | 5/2005 | Schulz | |
| 2005/0117022 A1 | 6/2005 | Marchant | |
| 2005/0129325 A1 | 6/2005 | Wu | |
| 2005/0147257 A1 | 7/2005 | Melchior et al. | |
| 2005/0248652 A1 | 11/2005 | Firestone et al. | |
| 2005/0268823 A1 | 12/2005 | Bakker et al. | |
| 2006/0013495 A1 | 1/2006 | Duan et al. | |
| 2006/0017807 A1 | 1/2006 | Lee et al. | |
| 2006/0028983 A1 | 2/2006 | Wright | |
| 2006/0029084 A1 | 2/2006 | Grayson | |
| 2006/0038878 A1 | 2/2006 | Takashima et al. | |
| 2006/0066717 A1 | 3/2006 | Miceli | |
| 2006/0072813 A1 | 4/2006 | Matsumoto et al. | |
| 2006/0082643 A1 | 4/2006 | Richards | |
| 2006/0093128 A1 | 5/2006 | Oxford | |
| 2006/0100004 A1 | 5/2006 | Kim et al. | |
| 2006/0104297 A1 | 5/2006 | Buyukkoc et al. | |
| 2006/0104470 A1 | 5/2006 | Akino | |
| 2006/0120307 A1 | 6/2006 | Sahashi | |
| 2006/0120568 A1 | 6/2006 | McConville et al. | |
| 2006/0125691 A1 | 6/2006 | Menache et al. | |
| 2006/0126878 A1 | 6/2006 | Takumai et al. | |
| 2006/0152489 A1 | 7/2006 | Sweetser et al. | |
| 2006/0152575 A1 | 7/2006 | Amiel et al. | |
| 2006/0158509 A1 | 7/2006 | Kenoyer et al. | |
| 2006/0168302 A1 | 7/2006 | Boskovic et al. | |
| 2006/0170769 A1 | 8/2006 | Zhou | |
| 2006/0181607 A1 | 8/2006 | McNelley et al. | |
| 2006/0200518 A1 | 9/2006 | Sinclair et al. | |
| 2006/0233120 A1 | 10/2006 | Eshel et al. | |
| 2006/0256187 A1 | 11/2006 | Sheldon et al. | |
| 2006/0284786 A1 | 12/2006 | Takano et al. | |

(56) References Cited

U.S. PATENT DOCUMENTS

| | | |
|---|---|---|
| 2006/0289772 A1 | 12/2006 | Johnson et al. |
| 2007/0019621 A1 | 1/2007 | Perry et al. |
| 2007/0039030 A1 | 2/2007 | Romanowich et al. |
| 2007/0040903 A1 | 2/2007 | Kawaguchi |
| 2007/0070177 A1 | 3/2007 | Christensen |
| 2007/0080845 A1 | 4/2007 | Amand |
| 2007/0112966 A1 | 5/2007 | Eftis et al. |
| 2007/0120971 A1 | 5/2007 | Kennedy |
| 2007/0121353 A1 | 5/2007 | Zhang et al. |
| 2007/0140337 A1 | 6/2007 | Lim et al. |
| 2007/0153712 A1* | 7/2007 | Fry et al. ............ 370/263 |
| 2007/0159523 A1 | 7/2007 | Hillis et al. |
| 2007/0183661 A1 | 8/2007 | El-Maleh et al. |
| 2007/0188597 A1 | 8/2007 | Kenoyer et al. |
| 2007/0189219 A1 | 8/2007 | Navoli et al. |
| 2007/0192381 A1 | 8/2007 | Padmanabhan |
| 2007/0206091 A1 | 9/2007 | Dunn et al. |
| 2007/0206556 A1 | 9/2007 | Yegani et al. |
| 2007/0206602 A1 | 9/2007 | Halabi et al. |
| 2007/0217406 A1 | 9/2007 | Riedel et al. |
| 2007/0217500 A1 | 9/2007 | Gao et al. |
| 2007/0229250 A1 | 10/2007 | Recker et al. |
| 2007/0240073 A1 | 10/2007 | McCarthy et al. |
| 2007/0247470 A1 | 10/2007 | Dhuey et al. |
| 2007/0250567 A1 | 10/2007 | Graham et al. |
| 2007/0250620 A1 | 10/2007 | Shah et al. |
| 2007/0273752 A1 | 11/2007 | Chambers et al. |
| 2007/0279483 A1 | 12/2007 | Beers et al. |
| 2007/0279484 A1 | 12/2007 | Derocher et al. |
| 2007/0285505 A1 | 12/2007 | Korneliussen |
| 2008/0043041 A2 | 2/2008 | Hedenstroem et al. |
| 2008/0044064 A1 | 2/2008 | His |
| 2008/0077390 A1 | 3/2008 | Nagao |
| 2008/0084429 A1 | 4/2008 | Wissinger |
| 2008/0136896 A1 | 6/2008 | Graham et al. |
| 2008/0151038 A1 | 6/2008 | Khouri et al. |
| 2008/0153537 A1 | 6/2008 | Khawand et al. |
| 2008/0167078 A1 | 7/2008 | Elbye |
| 2008/0198755 A1 | 8/2008 | Vasseur et al. |
| 2008/0208444 A1 | 8/2008 | Ruckart |
| 2008/0212677 A1 | 9/2008 | Chen et al. |
| 2008/0215974 A1 | 9/2008 | Harrison et al. |
| 2008/0218582 A1 | 9/2008 | Buckler |
| 2008/0219268 A1 | 9/2008 | Dennison |
| 2008/0232688 A1 | 9/2008 | Senior et al. |
| 2008/0232692 A1 | 9/2008 | Kaku |
| 2008/0240237 A1 | 10/2008 | Tian et al. |
| 2008/0240571 A1 | 10/2008 | Tian et al. |
| 2008/0246833 A1 | 10/2008 | Yasui et al. |
| 2008/0266380 A1 | 10/2008 | Gorzynski et al. |
| 2008/0267282 A1 | 10/2008 | Kalipatnapu et al. |
| 2008/0297586 A1 | 12/2008 | Kurtz et al. |
| 2008/0298571 A1 | 12/2008 | Kurtz et al. |
| 2008/0303901 A1 | 12/2008 | Variyath et al. |
| 2009/0009593 A1 | 1/2009 | Cameron et al. |
| 2009/0051756 A1 | 2/2009 | Trachtenberg |
| 2009/0115723 A1 | 5/2009 | Henty |
| 2009/0122867 A1 | 5/2009 | Mauchly et al. |
| 2009/0129753 A1 | 5/2009 | Wagenlander |
| 2009/0147070 A1* | 6/2009 | Marathe et al. ............ 348/14.09 |
| 2009/0174764 A1 | 7/2009 | Chadha et al. |
| 2009/0193345 A1 | 7/2009 | Wensley et al. |
| 2009/0207179 A1 | 8/2009 | Huang et al. |
| 2009/0207233 A1 | 8/2009 | Mauchly et al. |
| 2009/0207234 A1 | 8/2009 | Chen et al. |
| 2009/0244257 A1 | 10/2009 | MacDonald et al. |
| 2009/0256901 A1 | 10/2009 | Mauchly et al. |
| 2009/0279476 A1 | 11/2009 | Li et al. |
| 2009/0322082 A1 | 12/2009 | Wagoner |
| 2009/0324023 A1 | 12/2009 | Tian et al. |
| 2010/0008373 A1 | 1/2010 | Xiao et al. |
| 2010/0014530 A1 | 1/2010 | Cutaia |
| 2010/0027907 A1 | 2/2010 | Cherna et al. |
| 2010/0042281 A1 | 2/2010 | Filla |
| 2010/0082557 A1 | 4/2010 | Gao et al. |
| 2010/0118112 A1 | 5/2010 | Nimri et al. |
| 2010/0123770 A1 | 5/2010 | Friel et al. |
| 2010/0149301 A1 | 6/2010 | Lee et al. |
| 2010/0153853 A1 | 6/2010 | Dawes et al. |
| 2010/0171807 A1 | 7/2010 | Tysso |
| 2010/0171808 A1 | 7/2010 | Harrell et al. |
| 2010/0183199 A1 | 7/2010 | Smith et al. |
| 2010/0199228 A1 | 8/2010 | Latta et al. |
| 2010/0201823 A1 | 8/2010 | Zhang et al. |
| 2010/0202285 A1 | 8/2010 | Cohen et al. |
| 2010/0205281 A1 | 8/2010 | Porter et al. |
| 2010/0208078 A1 | 8/2010 | Tian et al. |
| 2010/0225732 A1 | 9/2010 | De Beer et al. |
| 2010/0225735 A1 | 9/2010 | Shaffer et al. |
| 2010/0241845 A1 | 9/2010 | Alonso |
| 2010/0259619 A1 | 10/2010 | Nicholson |
| 2010/0268843 A1 | 10/2010 | Van Wie et al. |
| 2010/0277563 A1 | 11/2010 | Gupta et al. |
| 2010/0283829 A1 | 11/2010 | De Beer et al. |
| 2010/0302345 A1 | 12/2010 | Baldino et al. |
| 2010/0316232 A1 | 12/2010 | Acero et al. |
| 2011/0008017 A1 | 1/2011 | Gausereide |
| 2011/0037636 A1 | 2/2011 | Alexander |
| 2011/0039506 A1 | 2/2011 | Lindahl et al. |
| 2011/0063467 A1 | 3/2011 | Tanaka |
| 2011/0085016 A1 | 4/2011 | Kristiansen et al. |
| 2011/0090303 A1 | 4/2011 | Wu et al. |
| 2011/0105220 A1 | 5/2011 | Hill et al. |
| 2011/0109642 A1 | 5/2011 | Chang et al. |
| 2011/0228096 A1 | 9/2011 | Friel et al. |
| 2011/0242266 A1 | 10/2011 | Blackburn et al. |
| 2011/0249086 A1 | 10/2011 | Guo et al. |
| 2011/0276901 A1 | 11/2011 | Zambetti et al. |
| 2012/0026278 A1 | 2/2012 | Goodman et al. |
| 2012/0038742 A1 | 2/2012 | Robinson et al. |
| 2012/0106428 A1 | 5/2012 | Schlicht et al. |
| 2012/0143605 A1 | 6/2012 | Thorsen et al. |
| 2012/0169838 A1 | 7/2012 | Sekine |
| 2012/0287302 A1 | 11/2012 | Tian et al. |
| 2013/0088565 A1* | 4/2013 | Buckler ............ 348/14.08 |

FOREIGN PATENT DOCUMENTS

| | | |
|---|---|---|
| EP | 502600 A2 | 9/1992 |
| EP | 0 650 299 | 10/1994 |
| EP | 0 714 081 | 11/1995 |
| EP | 0 740 177 | 4/1996 |
| EP | 1143745 A2 | 10/2001 |
| EP | 1 178 352 A1 | 6/2002 |
| EP | 1 589 758 A1 | 10/2005 |
| EP | 1701308 A2 | 9/2006 |
| EP | 1768058 A2 | 3/2007 |
| EP | 2073543 A1 | 6/2009 |
| EP | 2255531 | 12/2010 |
| EP | 2277308 | 1/2011 |
| GB | 2 294 605 A | 5/1996 |
| GB | 2336266 | 10/1999 |
| GB | 2355876 A | 5/2001 |
| WO | WO 94/16517 | 7/1994 |
| WO | WO 96/21321 | 7/1996 |
| WO | WO 97/08896 | 3/1997 |
| WO | WO 98/47291 | 10/1998 |
| WO | WO 99/59026 | 11/1999 |
| WO | WO 01/33840 | 5/2001 |
| WO | WO 2005/013001 | 2/2005 |
| WO | WO 2006/072755 | 7/2006 |
| WO | WO 2007/106157 | 9/2007 |
| WO | WO 2007/123946 | 11/2007 |
| WO | WO 2007/123960 A2 | 11/2007 |
| WO | WO 2008/039371 | 4/2008 |
| WO | WO 2008/040258 | 4/2008 |
| WO | WO 2008/101117 A1 | 8/2008 |
| WO | WO 2008/118887 A2 | 10/2008 |
| WO | WO 2009/102503 A2 | 8/2009 |
| WO | WO 2009/120814 A2 | 10/2009 |
| WO | WO 2010/059481 | 5/2010 |
| WO | WO 2010/096342 | 8/2010 |
| WO | WO 2010/104765 | 9/2010 |
| WO | WO 2010/132271 | 11/2010 |

(56) References Cited

FOREIGN PATENT DOCUMENTS

| WO | WO2012/033716 | 3/2012 |
|---|---|---|
| WO | WO 2012/068008 | 5/2012 |
| WO | WO 2012/068010 | 5/2012 |
| WO | WO 2012/068485 | 5/2012 |

OTHER PUBLICATIONS

Andersson, L., et al., "LDP Specification," Network Working Group, RFC 3036, Jan. 2001, 133 pages; http://tools.ietf.org/html/rfc3036.
Andreopoulos, Yiannis, et al., "In-Band Motion Compensated Temporal Filtering," Signal Processing: Image Communication 19 (2004) 653-673, 21 pages http://medianetlab.ee.ucla.edu/papers/011.pdf.
Arrington, Michael, "eJamming—Distributed Jamming," TechCrunch; Mar. 16, 2006; http://www.techcrunch.com/2006/03/16/ejamming-distributed-jamming/; 1 page.
Arulampalam, M. Sanjeev, et al., "A Tutorial on Particle Filters for Online Nonlinear/Non-Gaussian Bayesian Tracking," IEEE Transactions on Signal Processing, vol. 50, No. 2, Feb. 2002, 15 pages; http://www.cs.ubc.ca/~murphyk/Software/Kalman/ParticleFilterTutorial.pdf.
Avrithis, Y., et al., "Color-Based Retrieval of Facial Images," European Signal Processing Conference (EUSIPCO '00), Tampere, Finland; Sep. 2000; http://www.image.ece.ntua.gr/~ntsap/presentations/eusipco00.ppt#256; 18 pages.
Awduche, D., et al., "Requirements for Traffic Engineering over MPLS," Network Working Group, RFC 2702, Sep. 1999, 30 pages; http://tools.ietf.org/pdf/rfc2702.pdf.
Bakstein, Hynek, et al., "Visual Fidelity of Image Based Rendering," Center for Machine Perception, Czech Technical University, Proceedings of the Computer Vision, Winter 2004, http://www.benogo.dk/publications/Bakstein-Pajdla-CVWW04.pdf; 10 pages.
Beesley, S.T.C., et al., "Active Macroblock Skipping in the H.264 Video Coding Standard," in Proceedings of 2005 Conference on Visualization, Imaging, and Image Processing—VIIP 2005, Sep. 7-9, 2005, Benidorm, Spain, Paper 480-261. ACTA Press, ISBN: 0-88986-528-0; 5 pages.
Berzin, O., et al., "Mobility Support Using MPLS and MP-BGP Signaling," Network Working Group, Apr. 28, 2008, 60 pages; http://www.potaroo.net/ietf/all-/draft-berzin-malis-mpls-mobility-01.txt.
Boccaccio, Jeff; CEPro, "Inside HDMI CEC: The Little-Known Control Feature," Dec. 28, 2007; http://www.cepro.com/article/print/inside_hdmi_cec_the_little_known_control_feature; 2 pages.
Boros, S., "Policy-Based Network Management with SNMP," Proceedings of the EUNICE 2000 Summer School Sep. 13-15, 2000, p. 3.
Bücken R: "Bildfernsprechen: Videokonferenz vom Arbeitsplatz aus" Funkschau, Weka Fachzeitschriften Verlag, Poing, DE, No. 17, Aug. 14, 1986, pp. 41-43, XP002537729; ISSN: 0016-2841, p. 43, left-hand column, line 34-middle column, line 24.
Chan, Eric, et al., "Experiments on block-matching techniques for video coding," Multimedia Systems; 9 Springer-Verlag 1994, Multimedia Systems (1994) 2 pp. 228-241.
Chen et al., "Toward a Compelling Sensation of Telepresence: Demonstrating a Portal to a Distant (Static) Office," Proceedings Visualization 2000; VIS 2000; Salt Lake City, UT, Oct. 8-13, 2000; Annual IEEE Conference on Visualization, Los Alamitos, CA; IEEE Comp. Soc., US, Jan. 1, 2000, pp. 327-333; http://citeseerx.ist.psu.edu/viewdoc/summary?doi=10.1.1.35.1287.
Chen, Jason, "iBluetooth Lets iPhone Users Send and Receive Files Over Bluetooth," Mar. 13, 2009; http://i.gizmodo.com/5169545/ibluetooth-lets-iphone-users-send-and-receive-files-over-bluetooth; 1 page.
Chen, Qing, et al., "Real-time Vision-based Hand Gesture Recognition Using Haar-like Features," Instrumentation and Measurement Technology Conference, Warsaw, Poland, May 1-3, 2007, 6 pages; http://www.google.com/url?sa=t&source=web&cd=1&ved=0CB4QFjAA&url=http%3A%2F%2Fciteseerx.ist.psu.edu%2Fviewdoc%2Fdownload%3Fdoi%3D10.1.1.93.103%26rep%3Drep1%26type%3Dpdf&ei=A28RTLKRDeftnQeXzZGRAw&usg=AFQjCNHpwj5MwjgGp-3goVzSWad6CO-Jzw.

Chien et al., "Efficient moving Object Segmentation Algorithm Using Background Registration Technique," IEEE Transactions on Circuits and Systems for Video Technology, vol. 12, No. 7, Jul. 2002, 10 pages.
Cisco: Bill Mauchly and Mod Marathe; UNC: Henry Fuchs, et al., "Depth-Dependent Perspective Rendering," Apr. 15, 2008; 6 pages.
Costa, Cristina, et al., "Quality Evaluation and Nonuniform Compression of Geometrically Distorted Images Using the Quadtree Distorion Map," EURASIP Journal on Applied Signal Processing, Jan. 7, 2004, vol. 2004, No. 12; © 2004 Hindawi Publishing Corp.; XP002536356; ISSN: 1110-8657; pp. 1899-1911; http://downloads.hindawi.com/journals/asp/2004/470826.pdf.
Criminisi, A., et al., "Efficient Dense-Stereo and Novel-view Synthesis for Gaze Manipulation in One-to-one Teleconferencing," Technical Rpt MSR-TR-2003-59, Sep. 2003 [retrieved and printed on Feb. 26, 2009], http://research.microsoft.com/pubs/67266/criminis_techrep2003-59.pdf, 41 pages.
Cumming, Jonathan, "Session Border Control in IMS, An Analysis of the Requirements for Session Border Control in IMS Networks," Sections 1.1, 1.1.1, 1.1.3, 1.1.4, 2.1.1, 3.2, 3.3.1, 5.2.3 and pp. 7-8, Data Connection, 2005.
Daly, S., et al., "Face-based visually-optimized image sequence coding," Image Processing, 1998. ICIP 98. Proceedings; 1998 International Conference on Chicago, IL; Oct. 4-7, 1998, Los Alamitos; IEEE Computing; vol. 3, Oct. 4, 1998; ISBN: 978-0-8186-8821-8; XP010586786; pp. 443-447.
Diaz, Jesus, "Zcam 3D Camera is Like Wii Without Wiimote and Minority Report Without Gloves," Dec. 15, 2007; http://gizmodo.com/gadgets/zcam-depth-camera-could-be-wii-challenger/zcam-3d-camera-is-like-wii-without-wiimote-and-minority-report-without-gloves-334426.php; 3pages.
Diaz, Jesus, iPhone Bluetooth File Transfer Coming Soon (YES!); Jan. 26, 2009; http://i.gizmodo.com/5138797/iphone-bluetooth-file-transfer-coming-soon-yes; 1page.
Dornaika F., et al., "Head and Facial Animation Tracking Using Appearance-Adaptive Models and Particle Filters," 20040627; 20040627-20040602, Jun. 27, 2004, 22 pages; Heudiasy Research Lab, http://eprints.pascal-network.org/archive/00001231/01/rtvhci_chapter8.pdf.
DVE Digital Video Enterprises, "DVE Tele-Immersion Room," [retrieved and printed on Feb. 5, 2009] http://www.dvetelepresence.com/products/immersion_room.asp; 2 pages.
Dynamic Displays, copyright 2005-2008 [retrieved and printed on Feb. 24, 2009] http://www.zebraimaging.com/html/lighting_display.html, 2 pages.
ECmag.com, "IBS Products," Published Apr. 2009; http://www.ecmag.com/index.cfm?fa=article&articleID=10065; 2 pages.
Eisert, Peter, "Immersive 3-D Video Conferencing: Challenges, Concepts and Implementations," Proceedings of SPIE Visual Communications and Image Processing (VCIP), Lugano, Switzerland, Jul. 2003; 11 pages; http://iphome.hhi.de/eisert/papers/vcip03.pdf.
eJamming Audio, Learn More; [retrieved and printed on May 27, 2010] http://www.ejamming.com/learnmore/; 4 pages.
Electrophysics Glossary, "Infrared Cameras, Thermal Imaging, Night Vision, Roof Moisture Detection," [retrieved and printed on Mar. 18, 2010] http://www.electrophysics.com/Browse/Brw_Glossary.asp; 11 pages.
Farrukh, A., et al., Automated Segmentation of Skin-Tone Regions in Video Sequences, Proceedings IEEE Students Conference, ISCON_apos_02; Aug. 16-17, 2002; pp. 122-128.
Fiala, Mark, "Automatic Projector Calibration Using Self-Identifying Patterns," National Research Council of Canada, Jun. 20-26, 2005; http://www.procams.org/procams2005/papers/procams05-36.pdf; 6 pages.
Foote, J., et al., "Flycam: Practical Panoramic Video and Automatic Camera Control," in Proceedings of IEEE International Conference on Multimedia and Expo, vol. III, Jul. 30, 2000; pp. 1419-1422; http://citeseerx.ist.psu.edu/viewdoc/versions?doi=10.1.1.138.8686.
Freeman, Professor Wilson T., Computer Vision Lecture Slides, "6.869 Advances in Computer Vision: Learning and Interfaces," Spring 2005; 21 pages.
Garg, Ashutosh, et al., "Audio-Visual !Speaker Detection Using Dynamic Bayesian Networks," IEEE International Conference on

(56) References Cited

OTHER PUBLICATIONS

Automatic Face and Gesture Recognition, 2000 Proceedings, 7 pages; http://www.ifp.illinois.edu/~ashutosh/papers/FG00.pdf.

Gemmell, Jim, et al., "Gaze Awareness for Video-conferencing: A Software Approach," IEEE MultiMedia, Oct.-Dec. 2000; vol. 7, No. 4, pp. 26-35.

Geys et al., "Fast Interpolated Cameras by Combining a GPU Based Plane Sweep With a Max-Flow Regularisation Algorithm," Sep. 9, 2004; 3D Data Processing, Visualization and Transmission 2004, pp. 534-541.

Gotchev, Atanas, "Computer Technologies for 3D Video Delivery for Home Entertainment," International Conference on Computer Systems and Technologies; CompSysTech, Jun. 12-13, 2008; http://ecet.ecs.ru.acad.bg/cst08/docs/cp/Plenary/P.1.pdf; 6 pages.

Gries, Dan, "3D Particles Experiments in AS3 and Flash CS3, Dan's Comments," [retrieved and printed on May 24, 2010] http://www.flashandmath.com/advanced/fourparticles/notes.html; 3 pages.

Guernsey, Lisa, "Toward Better Communication Across the Language Barrier," Jul. 29, 1999; http://www.nytimes.com/1999/07/29/technology/toward-better-communication-across-the-language-barrier.html; 2 pages.

Guili, D., et al., "Orchestra!: A Distributed Platform for Virtual Musical Groups and Music Distance Learning over the Internet in JavaTM Technology" ; [retrieved and printed on Jun. 6, 2010] http://ieeexplore.ieee.org/stamp/stamp.jsp?tp=&arnumber=778626; 2 pages.

Gundavelli, S., et al., "Proxy Mobile IPv6," Network Working Group, RFC 5213, Aug. 2008, 93 pages; http://tools.ietf.org/pdf/rfc5213.pdf.

Gussenhoven, Carlos, "Chapter 5 Transcription of Dutch Intonation," Nov. 9, 2003, 33 pages; http://www.ru.nl/publish/pages/516003/todisun-ah.pdf.

Gvili, Ronen et al., "Depth Keying," 3DV System Ltd., [Retrieved and printed on Dec. 5, 2011] 11 pages; http://research.microsoft.com/en-us/um/people/eyalofek/Depth%20Key/DepthKey.pdf.

Habili, Nariman, et al., "Segmentation of the Face and Hands in Sign Language Video Sequences Using Color and Motion Cues" IEEE Transaction on Circuits and Systems for Video Technology, IEEE Service Center, vol. 14, No. 8, Aug. 1, 2004; ISSN: 1051-8215; XP011115755; pp. 1086-1097.

Hammadi, Nait Charif et al., "Tracking the Activity of Participants in a Meeting," Machine Vision and Applications, Springer, Berlin, De Lnkd—DOI:10.1007/S00138-006-0015-5, vol. 17, No. 2, May 1, 2006, pp. 83-93, XP019323925 http://citeseerx.ist.psu.edu/viewdoc/summary?doi=10.1.1.106.9832.

He, L., et al., "The Virtual Cinematographer: a Paradigm for Automatic Real-Time Camera Control and Directing," Proc. SIGGRAPH, ©1996; http://research.microsoft.com/en-us/um/people/lhe/papers/siggraph96.vc.pdf; 8 pages.

Hepper, D., "Efficiency Analysis and Application of Uncovered Background Prediction in a Low BitRate Image Coder," IEEE Transactions on Communications, vol. 38, No. 9, pp. 1578-1584, Sep. 1990.

Hock, Hans Henrich, "Prosody vs. Syntax: Prosodic rebracketing of final vocatives in English," 4 pages; [retrieved and printed on Mar. 3, 2011] http://speechprosody2010.illinois.edu/papers/100931.pdf.

Holographic Imaging, "Dynamic Holography for scientific uses, military heads up display and even someday HoloTV Using TI's DMD," [retrieved and printed on Feb. 26, 2009] http://innovation.swmed.edu/ research/instrumentation/res_inst_dev3d.html; 5 pages.

Hornbeck, Larry J., "Digital Light ProcessingTM: A New MEMS-Based Display Technology," [retrieved and printed on Feb. 26, 2009] http://focus.ti.com/pdfs/dlpdmd/17_Digital_Light_Processing_MEMS_display_technology.pdf; 22 pages.

IR Distribution Category @ Envious Technology, "IR Distribution Category," [retrieved and printed on Apr. 22, 2009] http://www.envioustechnology.com.au/ products/product-list.php?CID=305; 2 pages.

IR Trans—Products and Orders—Ethernet Devices, [retrieved and printed on Apr. 22, 2009] http://www.irtrans.de/en/shop/lan.php; 2 pages.

Isgro, Francesco et al., "Three-Dimensional Image Processing in the Future of Immersive Media," IEEE Transactions on Circuits and Systems for Video Technology, vol. 14, No. 3; XP011108796; ISSN: 1051-8215; Mar. 1, 2004; pp. 288-303.

Itoh, Hiroyasu, et al., "Use of a gain modulating framing camera for time-resolved imaging of cellular phenomena," SPIE vol. 2979, 1997, pp. 733-740.

Jamoussi, Bamil, "Constraint-Based LSP Setup Using LDP," MPLS Working Group, Sep. 1999, 34 pages; http://tools.ietf.org/html/draft-ietf-mpls-cr-ldp-03.

Jeyatharan, M., et al., "3GPP TFT Reference for Flow Binding," MEXT Working Group, Mar. 2, 2010, 11 pages; http://www.ietf.org/id/draft-jeyatharan-mext-flow-tftemp-reference-00.txt.

Jiang, Minqiang, et al., "On Lagrange Multiplier and Quantizer Adjustment for H.264 Frame-layer Video Rate Control," IEEE Transactions on Circuits and Systems for Video Technology, vol. 16, Issue 5, May 2006, pp. 663-669.

Jong-Gook Ko et al., "Facial Feature Tracking and Head Orientation-Based Gaze Tracking," ITC-CSCC 2000, International Technical Conference on Circuits/Systems, Jul. 11-13, 2000, 4 pages http://www.umiacs.umd.edu/~knkim/paper/itc-cscc-2000-jgko.pdf.

Kannangara, C.S., et al., "Complexity Reduction of H.264 Using Lagrange Multiplier Methods," IEEE Int. Conf. on Visual Information Engineering, Apr. 2005; www.rgu.ac.uk/files/h264_complexity_kannangara.pdf; 6 pages.

Kannangara, C.S., et al., "Low Complexity Skip Prediction for H.264 through Lagrangian Cost Estimation," IEEE Transactions on Circuits and Systems for Video Technology, vol. 16, No. 2, Feb. 2006; www.rgu.ac.uk/files/h264_skippredict_richardson_final.pdf; 20 pages.

Kauff, Peter, et al., "An Immersive 3D Video-Conferencing System Using Shared Virtual Team User Environments," Proceedings of the 4th International Conference on Collaborative Virtual Environments, XP040139458; Sep. 30, 2002; http://ip.hhi.de/imedia_G3/assets/pdfs/CVE02.pdf; 8 pages.

Kazutake, Uehira, "Simulation of 3D image depth perception in a 3D display using two stereoscopic displays at different depths," Jan. 30, 2006; http://adsabs.harvard.edu/abs/2006SPIE.6055.408U; 2 pages.

Keijser, Jeroen, et al., "Exploring 3D Interaction in Alternate Control-Display Space Mappings," IEEE Symposium on 3D User Interfaces, Mar. 10-11, 2007, pp. 17-24.

Kim, Y.H., et al., "Adaptive mode decision for H.264 encoder," Electronics letters, vol. 40, Issue 19, pp. 1172-1173, Sep. 2004; 2 pages.

Klint, Josh, "Deferred Rendering in Leadwerks Engine," Copyright Leadwerks Corporation © 2008; http://www.leadwerks.com/files/Deferred_Rendering_in_Leadwerks_Engine.pdf; 10 pages.

Kolsch, Mathias, "Vision Based Hand Gesture Interfaces for Wearable Computing and Virtual Environments," A Dissertation submitted in partial satisfaction of the requirements for the degree of Doctor of Philosophy in Computer Science, University of California, Santa Barbara, Nov. 2004, 288 pages; http://fulfillment.umi.com/dissertations/b7afbcb56ba72fdb14d26dfccc6b470f/1291487062/3143800.pdf.

Koyama, S., et al. "A Day and Night Vision MOS Imager with Robust Photonic-Crystal-Based RGB-and-IR," Mar. 2008, pp. 754-759; ISSN: 0018-9383; IEE Transactions on Electron Devices, vol. 55, No. 3; http://ieeexplore.ieee.org/stamp/stamp.jsp?tp=&arnumber=4455782&isnumber=4455723.

Kwolek, B., "Model Based Facial Pose Tracking Using a Particle Filter," Geometric Modeling and Imaging—New Trends, 2006 London, England Jul. 5-6, 2005, Piscataway, NJ, USA, IEEE LNKD-DOI: 10.1109/GMAI.2006.34 Jul. 5, 2006, pp. 203-208; XP010927285 [Abstract Only].

Lambert, "Polycom Video Communications," © 2004 Polycom, Inc., Jun. 20, 2004 http://www.polycom.com/global/documents/whitepapers/video_communications_h.239_people_content_polycom_patented_technology.pdf.

Lawson, S., "Cisco Plans TelePresence Translation Next Year," Dec. 9, 2008; http://www.pcworld.com/ article/155237/.html?tk=rss_news; 2 pages.

(56) References Cited

OTHER PUBLICATIONS

Lee, J. and Jeon, B., "Fast Mode Decision for H.264," ISO/IEC MPEG and ITU-T VCEG Joint Video Team, Doc. JVT-J033, Dec. 2003; http://media.skku.ac.kr/publications/paper/IntC/Ijy_ICME2004.pdf; 4 pages.

Liu, Shan, et al., "Bit-Depth Scalable Coding for High Dynamic Range Video," SPIE Conference on Visual Communications and Image Processing, Jan. 2008; 12 pages http://www.merl.com/papers/docs/TR2007-078.pdf.

Liu, Z., "Head-Size Equalization for Better Visual Perception of Video Conferencing," Proceedings, IEEEInternational Conference on Multimedia & Expo (ICME2005), Jul. 6-8, 2005, Amsterdam, The Netherlands; http://research.microsoft.com/users/cohen/HeadSizeEqualizationICME2005.pdf; 4 pages.

Mann, S., et al., "Virtual Bellows: Constructing High Quality Still from Video," Proceedings, First IEEE International Conference on Image Processing ICIP-94, Nov. 13-16, 1994, Austin, TX; http://citeseerx.ist.psu.edu/viewdoc/summary?doi=10.1.1.50.8405; 5 pages.

Marvin Imaging Processing Framework, "Skin-colored pixels detection using Marvin Framework," video clip, YouTube, posted Feb. 9, 2010 by marvinproject, 1 page; http://www.youtube.com/user/marvinproject#p/a/u/0/3ZuQHYNlcrI.

Miller, Gregor, et al., "Interactive Free-Viewpoint Video," Centre for Vision, Speech and Signal Processing, [retrieved and printed on Feb. 26, 2009], http://www.ee.surrey.ac.uk/CVSSP/VMRG/ Publications/miller05cvmp.pdf, 10 pages.

Miller, Paul, "Microsoft Research patents controller-free computer input via EMG muscle sensors," Engadget.com, Jan. 3, 2010, 1 page; http://www.engadget.com/2010/01/03/microsoft-research-patents-controller-free-computer-input-via-em/.

Minoru from Novo is the worlds first consumer 3D Webcam, Dec. 11, 2008; http://www.minoru3d.com; 4 pages.

Mitsubishi Electric Research Laboratories, copyright 2009 [retrieved and printed on Feb. 26, 2009], http://www.merl.com/projects/3dtv, 2 pages.

Nakaya, Y., et al. "Motion Compensation Based on Spatial Transformations," IEEE Transactions on Circuits and Systems for Video Technology, Jun. 1994, Abstract Only http://ieeexplore.ieee.org/Xplore/login.jsp?url=http%3A%2F%2Fieeexplore.ieee.org%2Fiel5%2F76%2F7495%2F00305878.pdf%3Farnumber%3D305878&authDecision=-203.

National Training Systems Association Home—Main, Interservice/Industry Training, Simulation & Education Conference, Dec. 1-4, 2008; http://ntsa.metapress.com/app/home/main.asp?referrer=default; 1 page.

Oh, Hwang-Seok, et al., "Block-Matching Algorithm Based on Dynamic Search Window Adjustment," Dept. of CS, KAIST, 1997, 6 pages; http://citeseerx.ist.psu.edu/viewdoc/similar?doi=10.1.1.29.8621&type=ab.

Opera Over Cisco TelePresence at Cisco Expo 2009, in Hannover Germany—Apr. 28, 29, posted on YouTube on May 5, 2009; http://www.youtube.com/watch?v=xN5jNH5E-38; 1 page.

OptoIQ, "Vision + Automation Products—VideometerLab 2," [retrieved and printed on Mar. 18, 2010], http://www.optoiq.com/optoiq-2/en-us/index/machine-vision-imaging-processing/display/vsd-articles-tools-template.articles.vision-systems-design.volume-11.issue-10.departments.new-products.vision-automation-products.htmlhtml; 11 pages.

OptoIQ, "Anti-Speckle Techniques Uses Dynamic Optics," Jun. 1, 2009; http://www.optoiq.com/index/photonics-technologies-applications/lfw-display/lfw-article-display/363444/articles/optoiq2/photonics-technologies/technology-products/optical-components/optical-mems/2009/12/anti-speckle-technique-uses-dynamic-optics/QP129867/cmpid=EnIOptoLFWJanuary132010.html; 2 pages.

OptoIQ, "Smart Camera Supports Multiple Interfaces," Jan. 22, 2009; http://www.optoiq.com/index/machine-vision-imaging-processing/display/vsd-article-display/350639/articles/vision-systems-design/daily-product-2/2009/01/smart-camera-supports-multiple-interfaces.html; 2 pages.

OptoIQ, "Vision Systems Design—Machine Vision and Image Processing Technology," [retrieved and printed on Mar. 18, 2010], http://www.optoiq.com/index/machine-vision-imaging-processing.html; 2 pages.

Patterson, E.K., et al., "Moving-Talker, Speaker-Independent Feature Study and Baseline Results Using the CUAVE Multimodal Speech Corpus," EURASIP Journal on Applied Signal Processing, vol. 11, Oct. 2002, 15 pages http://www.clemson.edu/ces/speech/papers/CUAVE_Eurasip2002.pdf.

Payatagool, Chris, "Orchestral Manoeuvres in the Light of Telepresence," Telepresence Options, Nov. 12, 2008; http://www.telepresenceoptions.com/2008/11/orchestral_manoeuvres; 2pages.

Perez, Patrick, et al., "Data Fusion for Visual Tracking with Particles," Proceedings of the IEEE, vol. XX, No. XX, Feb. 2004, 18 pages http://citeseer.ist.psu.edu/viewdoc/summary?doi=10.1.1.6.2480.

Pixel Tools "Rate Control and H.264: H.264 rate control algorithm dynamically adjusts encoder parameters," [retrieved and printed on Jun. 10, 2010] http://www.pixeltools.om/rate_control_paper.html; 7 pages.

Potamianos, G., et a., "An Image Transform Approach for HMM Based Automatic Lipreading," in Proceedings of IEEE ICIP, vol. 3, 1998, 5 pages http://citeseerx.ist.psu.edu/viewdoc/summary?doi=10.1.1.13.6802.

Radhika, N., et al., "Mobile Dynamic reconfigurable Context aware middleware for Adhoc smart spaces," Academic Open Internet Journal, ISSN 1311-4360, vol. 22, 2008; 3 pages http://www.acadjournal.com/2008/V22/part6/p7.

Rayvel Business-to-Business Products, copyright 2004 [retrieved and printed on Feb. 24, 2009], http://www.rayvel.com/b2b.html; 2 pages.

Richardson, I.E.G., et al., "Fast H.264 Skip Mode Selection Using and Estimation Framework," Picture Coding Symposium, (Beijing, China), Apr. 2006; www.rgu.ac.uk/files/richardson_fast_skip_estmation_pcs06.pdf; 6 pages.

Richardson, Iain, et al., "Video Encoder Complexity Reduction by Estimating Skip Mode Distortion," Image Communication Technology Group; [Retrieved and printed Oct. 21, 2010] 4 pages; http://www4.rgu.ac.uk/files/ICIP04_richardson_zhao_final.pdf.

Rikert, T.D., et al., "Gaze Estimation using Morphable models," IEEE International Conference on Automatic Face and Gesture Recognition, Apr. 1998; 7 pgs http://citeseer.ist.psu.edu/viewdoc/summary?doi=10.1.1.30.9472.

Butler, Darren, et al., "Robust Face Localisation Using Motion, Colour & Fusion" ; Proc. VIIth Digital Image Computing: Techniques and Applications, Sun C. et al (Eds.), Sydney; XP007905630; pp. 899-908; Dec. 10, 2003; http://www.cmis.csiro.au/Hugues.Talbot/dicta2003/cdrom/pdf/0899.pdf.

Satoh, Kiyohide et al., "Passive Depth Acquisition for 3D Image Displays", IEICE Transactions on Information and Systems, Information Systems Society, Tokyo, JP, Sep. 1, 1994, vol. E77-D, No. 9, pp. 949-957.

School of Computing, "Bluetooth over IP for Mobile Phones," 2005; http://www.computing.dcu.ie/wwwadmin/fyp-abstract/list/fyp_details05.jsp?year=2005&number=51470574; 1 page.

Schroeder, Erica, "The Next Top Model—Collaboration," Collaboration, The Workspace: A New World of Communications and Collaboration, Mar. 9, 2009; http//blogs.cisco.com/collaboration/comments/the_next_top_model; 3 pages.

Sena, "Industrial Bluetooth," [retrieved and printed on Apr. 22, 2009] http://www.sena.com/products/industrial_bluetooth; 1 page.

Shaffer, Shmuel, "Translation—State of the Art" presentation; Jan. 15, 2009; 22 pages.

Shi, C. et al., "Automatic Image Quality Improvement for Videoconferencing," IEEE ICASSP May 2004; http://research.microsoft.com/pubs/69079/0300701.pdf; 4 pages.

Shum, H.-Y, et al., "A Review of Image-Based Rendering Techniques," in SPIE Proceedings vol. 4067(3); Proceedings of the Conference on Visual Communications and Image Processing 2000, Jun.

(56) References Cited

OTHER PUBLICATIONS 20-23, 2000, Perth, Australia; pp. 2-13; https://research.microsoft.com/pubs/68826/review_image_rendering.pdf.
Smarthome, "IR Extender Expands Your IR Capabilities," [retrieved and printed on Apr. 22, 2009], http://www.smarthome.com/8121.html; 3 pages.
Soliman, H., et al., "Flow Bindings in Mobile IPv6 and NEMO Basic Support," IETF MEXT Working Group, Nov. 9, 2009, 38 pages; http://tools.ietf.org/html/draft-ietf-mext-flow-binding-04.
Sonoma Wireworks Forums, "Jammin on Rifflink," [retrieved and printed on May 27, 2010] http://www.sonomawireworks.com/forums/viewtopic.php?id=2659; 5 pages.
Sonoma Wireworks Rifflink, [retrieved and printed on Jun. 2, 2010] http://www.sonomawireworks.com/rifflink.php; 3 pages.
Soohuan, Kim, et al., "Block-based face detection scheme using face color and motion estimation," Real-Time Imaging VIII; Jan. 20-22, 2004, San Jose, CA; vol. 5297, No. 1; Proceedings of the SPIE—The International Society for Optical Engineering SPIE-Int. Soc. Opt. Eng USA ISSN: 0277-786X; XP007905596; pp. 78-88.
Sudan, Ranjeet, "Signaling in MPLS Networks with RSVP-TE-Technology Information," Telecommunications, Nov. 2000, 3 pages; http://findarticles.com/p/articles/mi_mOTLC/is_11_34/ai_67447072/.
Sullivan, Gary J., et al., "Video Compression—From Concepts to the H.264/AVC Standard," Proceedings IEEE, vol. 93, No. 1, Jan. 2005; http://ip.hhi.de/imagecom_G1/assets/pdfs/pieee_sullivan_wiegand_2005.pdf; 14 pages.
Sun, X., et al., "Region of Interest Extraction and Virtual Camera Control Based on Panoramic Video Capturing," IEEE Trans. Multimedia, Oct. 27, 2003; http://vision.ece.ucsb.edu/publications/04mmXdsun.pdf; 14 pages.
Super Home Inspectors or Super Inspectors, [retrieved and printed on Mar. 18, 2010] http://www.umrt.com/PageManager/Default.aspx/PageID=2120325; 3 pages.
Tan, Kar-Han, et al., "Appearance-Based Eye Gaze Estimation," In Proceedings IEEE WACV'02, 2002, 5 pages http://citeseer.ist.psu.edu/viewdoc/summary?doi=10.1.1.19.8921.
Total immersion, Video Gallery, copyright 2008-2009 [retrieved and printed on Feb. 26, 2009], http://www.t-immersion.com/en,video-gallery,36.html, 1 page.
Trucco, E., et al., "Real-Time Disparity Maps for Immersive 3-D Teleconferencing by Hybrid Recursive Matching and Census Transform," [retrieved and printed on May 4, 2010] http://server.cs.ucf.edut-vision/papers/VidReg-final.pdf; 9 pages.
Tsapatsoulis, N., et al., "Face Detection for Multimedia Applications," Proceedings of the ICIP Sep. 10-13, 2000, Vancouver, BC, Canada; vol. 2, pp. 247-250.
Tsapatsoulis, N., et al., "Face Detection in Color Images and Video Sequences," 10th Mediterranean Electrotechnical Conference (MELECON), May 29-31, 2000; vol. 2; pp. 498-502.
Veratech Corp., "Phantom Sentinel," ©VeratechAero 2006, 1 page; http://www.veratechcorp.com/phantom.html.
Vertegaal, Roel, et al., "GAZE-2: Conveying Eye Contact in Group Video Conferencing Using Eye-Controlled Camera Direction," CHI 2003, Apr. 5-10, 2003, Fort Lauderdale, FL; Copyright 2003 ACM 1-58113-630-7/03/0004; 8 pages; http://www.hml.queensu.ca/papers/vertegaalchi0403.pdf.
PRC Aug. 3, 2012 SIPO First Office Action from Chinese Application No. 200980119121.5; 16 pages.
PRC Dec. 18, 2012 Response to SIPO First Office Action from Chinese Application No. 200980119121.5; 16 pages.
PRC Jan. 7, 2013 SIPO Second Office Action from Chinese Application Serial No. 200980105262.1.
PRC Apr. 3, 2013 SIPO Second Office Action from Chinese Application No. 200980119121.5; 16 pages.
PRC Jun. 18, 2013 Response to SIPO Second Office Action from Chinese Application No. 200980119121.5; 5 pages.
U.S. Appl. No. 12/366,593, filed Feb. 5, 2009, entitled "System and Method for Depth Perspective Image Rendering," Inventor(s): J. William Mauchly et al.
U.S. Appl. No. 12/781,722, filed May 17, 2010, entitled "System and Method for Providing Retracting Optics in a Video Conferencing Environment," Inventor(s): Joseph T. Friel, et al.
U.S. Appl. No. 12/877,833, filed Sep. 8, 2010, entitled "System and Method for Skip Coding During Video Conferencing in a Network Environment," Inventor[s]: Dihong Tian, et al.
U.S. Appl. No. 12/870,687, filed Aug. 27, 2010, entitled "System and Method for Producing a Performance Via Video Conferencing in a Network Environment," Inventor(s): Michael A. Arnao et al.
U.S. Appl. No. 12/912,556, filed Oct. 26, 2010, entitled "System and Method for Provisioning Flows in a Mobile Network Environment," Inventors: Balaji Vankat Vankataswami, et al.
U.S. Appl. No. 12/949,614, filed Nov. 18, 2010, entitled "System and Method for Managing Optics in a Video Environment," Inventors: Torence Lu, et al.
U.S. Appl. No. 12/873,100, filed Aug. 31, 2010, entitled "System and Method for Providing Depth Adaptive Video Conferencing," Inventor(s): J. William Mauchly et al.
U.S. Appl. No. 12/946,679, filed Nov. 15, 2010, entitled "System and Method for Providing Camera Functions in a Video Environment," Inventors: Peter A.J. Fornell, et al.
U.S. Appl. No. 12/946,695, filed Nov. 15, 2010, entitled "System and Method for Providing Enhanced Audio in a Video Environment," Inventors: Wei Li, et al.
U.S. Appl. No. 12/907,914, filed Oct. 19, 2010, entitled "System and Method for Providing Videomail in a Network Environment," Inventors: David J. Mackie et al.
U.S. Appl. No. 12/950,786, filed Nov. 19, 2010, entitled "System and Method for Providing Enhanced Video Processing in a Network Environment," Inventor[s]: David J. Mackie.
U.S. Appl. No. 12/907,919, filed Oct. 19, 2010, entitled "System and Method for Providing Connectivity in a Network Environment," Inventors: David J. Mackie et al.
U.S. Appl. No. 12/946,704, filed Nov. 15, 2010, entitled "System and Method for Providing Enhanced Graphics in a Video Environment," Inventors: John M. Kanalakis, Jr., et al..
U.S. Appl. No. 12/957,116, filed Nov. 30, 2010, entitled "System and Method for Gesture Interface Control," Inventors: Shuan K. Kirby, et al.
U.S. Appl. No. 13/036,925, filed Feb. 28, 2011, entitled "System and Method for Selection of Video Data in a Video Conference Environment," Inventor(s) Sylvia Olayinka Aya Manfa N'guessan.
U.S. Appl. No. 12/907,925, filed Oct. 19, 2010, entitled "System and Method for Providing a Pairing Mechanism in a Video Environment," Inventors: Gangfeng Kong et al.
U.S. Appl. No. 12/939,037, filed Nov. 3, 2010, entitled "System and Method for Managing Flows in a Mobile Network Environment," Inventors: Balaji Venkat Venkataswami et al.
U.S. Appl. No. 13/096,772, filed Apr. 28, 2011, entitled "System and Method for Providing Enhanced Eye Gaze in a Video Conferencing Environment," Inventors: Charles C. Byers et al.
U.S. Appl. No. 12/946,709, filed Nov. 15, 2010, entitled "System and Method for Providing Enhanced Graphics in a Video Environment," Inventors: John M. Kanalakis, Jr., et al.
U.S. Appl. No. 13/106,002, filed May 12, 2011, entitled "System and Method for Video Coding in a Dynamic Environment," Inventors: Dihong Tian et al.
U.S. Appl. No. 13/096,795, filed Apr. 28, 2011, entitled "System and Method for Providing Enhanced Eye Gaze in a Video Conferencing Environment," Inventors: Charles C. Byers et al.
U.S. Appl. No. 12/784,257, filed May 20, 2010, entitled "Implementing Selective Image Enhancement," Inventors: Dihong Tian et al.
Design U.S. Appl. No. 29/389,651, filed Apr. 14, 2011, entitled "Video Unit With Integrated Features," Inventor(s): Kyle A. Buzzard et al.
Design U.S. Appl. No. 29/389,654, filed Apr. 14, 2011, entitled "Video Unit With Integrated Features," Inventor(s): Kyle A. Buzzard et al.
Design U.S. Appl. No. 29/381,245, filed Dec. 16, 2010, entitled "Interface Element," Inventor(s): John M. Kanalakis, Jr., et al.
Design U.S. Appl. No. 29/381,250, filed Dec. 16, 2010, entitled "Interface Element," Inventor(s): John M. Kanalakis, Jr., et al.

(56) References Cited

OTHER PUBLICATIONS

Design U.S. Appl. No. 29/381,254, filed Dec. 16, 2010, entitled "Interface Element," Inventor(s): John M. Kanalakis, Jr., et al.
Design U.S. Appl. No. 29/381,256, filed Dec. 16, 2010, entitled "Interface Element," Inventor(s): John M. Kanalakis, Jr., et al.
Design U.S. Appl. No. 29/381,259, filed Dec. 16, 2010, entitled "Interface Element," Inventor(s): John M. Kanalakis, Jr., et al.
Design U.S. Appl. No. 29/381,260, filed Dec. 16, 2010, entitled "Interface Element," Inventor(s): John M. Kanalakis, Jr., et al.
Design U.S. Appl. No. 29/381,262, filed Dec. 16, 2010, entitled "Interface Element," Inventor(s): John M. Kanalakis, Jr., et al.
Design U.S. Appl. No. 29/381,264, filed Dec. 16, 2010, entitled "Interface Element," Inventor(s): John M. Kanalakis, Jr., et al.
PCT "International Search Report and the Written Opinion of the International Searching Authority, or the Declaration," PCT/US2010/026456, dated Jun. 29, 2010; 11 pages.
PCT "Notification of Transmittal of the International Search Report and the Written Opinion of the International Searching Authority, or the Declaration," PCT/US2009/001070, dated Apr. 4, 2009; 14 pages.
PCT "Notification of Transmittal of the International Search Report and the Written Opinion of the International Searching Authority, or the Declaration," PCT/US2009/038310; dated Oct. 10, 2009; 17 pages.
PCT "International Preliminary Report on Patentability and Written Opinion of the International Searching Authority," PCT/US2009/038310; dated Sep. 28, 2010; 10 pages.
PCT "International Preliminary Report on Patentability dated Sep. 29, 2009, International Search Report, and Written Opinion," for PCT International Application PCT/US2008/058079; dated Sep. 18, 2008, 10 pages.
"3D Particles Experiments in AS3 and Flash CS3," [retrieved and printed on Mar. 18, 2010]; 2 pages; http://www.flashandmath.com/advanced/fourparticles/notes.html.
3G, "World's First 3G Video Conference Service with New TV Commercial," Apr. 28, 2005, 4 pages; http://www.3g.co.uk/Pr/April2005/1383.htm.
Digital Video Enterprises, "DVE Eye Contact Silhouette," 1 page, © DVE 2008; http://www.dvetelepresence.com/products/eyeContactSilhouette.asp.
"Eye Gaze Response Interface Computer Aid (Erica) tracks Eye movement to enable hands-free computer operation," UMD Communication Sciences and Disorders Tests New Technology, University of Minnesota Duluth, posted Jan. 19, 2005; 4 pages http://www.d.umn.edu/unirel/homepage/05/eyegaze.html.
France Telecom R&D, "France Telecom's Magic Telepresence Wall—Human Productivity Lab," 5 pages, retrieved and printed on May 17, 2010; http://www.humanproductivitylab.com/archive_blogs/2006/07/11/france_telecoms_magic_telepres_1.php.
Joshua Gluckman and S.K. Nayar, "Rectified Catadioptric Stereo Sensors," 8 pages, retrieved and printed on May 17, 2010; http://cis.poly.edu/~gluckman/papers/cypr00.pdf.
R.V. Kollarits, et al., "34.3: An Eye Contact Camera/Display System for Videophone Applications Using a Conventional Direct-View LCD," © 1995 SID, ISSN0097-0966X/95/2601, pp. 765-768; http://citeseerx.ist.psu.edu/viewdoc/download;jsessionid=47A1E7E028C26503975E633895D114EC?doi=10.1.1.42.1772&rep=rep1&type=pdf.
Trevor Darrell, "A Real-Time Virtual Mirror Display," 1 page, Sep. 9, 1998; http://people.csail.mit.edu/trevor/papers/1998-021/node6.html.
Video on TED.com, Pranav Mistry: the Thrilling Potential of SixthSense Technology (5 pages) and Interactive Transcript (5 pages), retrieved and printed on Nov. 30, 2010; http://www.ted.com/talks/pranav_mistry_the_thrilling_potential_of_sixthsense_technology.html.
EPO Feb. 25, 2011 Communication for EP09725288.6 (published as EP22777308); 4 pages.
EPO Aug. 15, 2011 Response to EPO Communication mailed Feb. 25, 2011 from European Patent Application No. 09725288.6; 15 pages.
EPO Nov. 3, 2011 Communication from European Application EP10710949.8; 2 pages.
EPO Mar. 12, 2012 Response to EP Communication dated Nov. 3, 2011 from European Application EP10710949.8; 15 pages.
EPO Mar. 20, 2012 Communication from European Application 09725288.6; 6 pages.
EPO Jul. 10, 2012 Response to EP Communication from European Application EP10723445.2
EPO Sep. 24, 2012 Response to Mar. 20, 2012 EP Communication from European Application EP09725288.6.
PCT Feb. 23, 2010 PCT Notification of Transmittal of the International Search Report and the Written Opinion of the International Searching Authority, or the Declaration for PCT/US2009/064061 mailed Feb. 23, 2010; 14 pages.
PCT Aug. 24, 2010 PCT International Search Report mailed Aug. 24, 2010 for PCT/US2010033880; 4 pages.
PCT Aug. 26, 2010 International Preliminary Report on Patentability mailed Aug. 26, 2010 for PCT/US2009/001070; 10 pages.
PCT Oct. 12, 2011 International Search Report and Written Opinion of the ISA from PCT/US2011/050380.
PCT Nov. 24, 2011 International Preliminary Report on Patentability from International Application Serial No. PCT/US2010/033880; 6 pages.
PCT Aug. 23, 2011 International Preliminary Report on Patentability and Written Opinion of the ISA from PCT/US2010/024059; 6 pages.
PCT Sep. 13, 2011 International Preliminary Report on Patentability and the Written Opinion of the ISA from PCT/US2010/026456; 5 pages.
PCT Jan. 23, 2012 International Search Report and Written Opinion of the ISA from International Application Serial No. PCT/US2011/060579; 10 pages.
PCT Jan. 23, 2012 International Search Report and Written Opinion of the ISA from International Application Serial No. PCT/US2011/060584; 11 pages.
PCT Feb. 20, 2012 International Search Report and Written Opinion of the ISA from International Application Serial No. PCT/US2011/061442; 12 pages.
PCT Mar. 21, 2013 International Preliminary Report on Patentability from International Application Serial No. PCT/US2011/050380.
PCT May 30, 2013 International Preliminary Report on Patentability and Written Opinion from the International Searching Authority for International Application Serial No. PCT/US2011/061442 8 pages.
PCT May 30, 2013 International Preliminary Report on Patentability and Written Opinion from the International Searching Authority for International Application Serial No. PCT/US2011/060579 6 pages.
PCT May 30, 2013 International Preliminary Report on Patentability and Written Opinion from the International Searching Authority for International Application Serial No. PCT/US2011/060584 7 pages.
Wachs, J., et al., "A Real-time Hand Gesture System Based on Evolutionary Search," Vision, $3^{rd}$ Quarter 2006, vol. 22, No. 3, 18 pages; http://web.ics.purdue.edu/~jpwachs/papers/3q06vi.pdf.
Wang, Hualu, et al., "A Highly Efficient System for Automatic Face Region Detection inMPEG Video," IEEE Transactions on Circuits and Systems for Video Technology; vol. 7, Issue 4; 1977 pp. 615-628.
Wang, Robert and Jovan Popovic, "Bimanual rotation and scaling," video clip, YouTube, posted by rkeltset on Apr. 14, 2010, 1 page; http://www.youtube.com/watch?v=7TPFSCX79U.
Wang, Robert and Jovan Popovic, "Desktop virtual reality," video clip, YouTube, posted by rkeltset on Apr. 8, 2010, 1 page; http://www.youtube.com/watch?v=9rBtm62Lkfk.
Wang, Robert and Jovan Popovic, "Gestural user input," video clip, YouTube, posted by rkeltset on May 19, 2010, 1 page; http://www.youtube.com/watch?v=3JWYTtBjdTE.
Wang, Robert and Jovan Popovic, "Manipulating a virtual yoke," video clip, YouTube, posted by rkeltset on Jun. 8, 2010, 1 page; http://www.youtube.com/watch?v=UfgGOO2uM.
Wang, Robert and Jovan Popovic, "Real-Time Hand-Tracking with a Color Glove, ACM Transaction on Graphics," 4 pages, [Retrieved and printed on Dec. 1, 2010] http://people.csail.mit.edu/rywang/hand.

(56) References Cited

OTHER PUBLICATIONS

Wang, Robert and Jovan Popovic, "Real-Time Hand-Tracking with a Color Glove, ACM Transaction on Graphics" (SIGGRAPH 2009), 28(3), Aug. 2009; 8 pages http://people.csail.mit.edu/rywang/handtracking/s09-hand-tracking.pdf.

Wang, Robert and Jovan Popovic, "Tracking the 3D pose and configuration of the hand," video clip, YouTube, posted by rkeltset on Mar. 31, 2010, 1 page; http://www.youtube.com/watch?v=JOXwJkWP6Sw.

"Cisco Expo Germany 2009 Opening," Posted on YouTube on May 4, 2009; http://www.youtube.com/watch?v=SDKsaSlz4MK; 2 pages.

"Eye Tracking," from Wikipedia, (printed on Aug. 31, 2011) 12 pages; http://en.wikipedia.org/wiki/Eye_tracker.

"Infrared Cameras TVS-200-EX," [retrieved and printed on May 24, 2010] http://www.electrophysics.com/Browse/Brw_ProductLineCategory.asp?CategoryID=184&Area=IS; 2 pages.

"RoundTable, 360 Degrees Video Conferencing Camera unveiled by Microsoft," TechShout, Jun. 30, 2006, 1 page; http://www.techshout.com/gadgets/2006/30/roundtable-360-degrees-video-conferencing-camera-unveiled-by-microsoft/#.

"Vocative Case," from Wikipedia, [retrieved and printed on Mar. 3, 2011] 11 pages; http://en.wikipedia.org/wiki/Vocative_case.

"Custom 3D Depth Sensing Prototype System for Gesture Control," 3D Depth Sensing, GestureTek, 3 pages; [Retrieved and printed on Dec. 1, 2010] http://www.gesturetek.com/3ddepth/introduction.php.

"Real-time Hand Motion/Gesture Detection for HCI-Demo 2," video clip, YouTube, posted Dec. 17, 2008 by smmy0705, 1 page; www.youtube.com/watch?v=mLT4CFLli8A&feature=related.

"Simple Hand Gesture Recognition," video clip, YouTube, posted Aug. 25, 2008 by pooh8210, 1 page; http://www.youtube.com/watch?v=F8GVeV0dYLM&feature=related.

\* cited by examiner

SYSTEM AND METHOD FOR ALERTING A PARTICIPANT IN A VIDEO CONFERENCE

TECHNICAL FIELD

This disclosure relates in general to the field of communications and, more particularly, to a system and a method for alerting a participant in a video conference.

BACKGROUND

Video services have become increasingly important in today's society. Enterprises of various sizes and types can collaborate through video conference tools. A video conference allows people at two or more locations to interact with each other via two-way video and audio transmissions. Such video conference technology can allow enterprises to cut costs, while boosting productivity. Video conference architectures can simulate face-to-face interactions between people using advanced visual, audio, and collaboration technologies. While video conferencing performance has steadily increased, component manufacturers, service providers, and engineering developers continue to be challenged to offer a lifelike meeting experiences for their end users.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example is method is provided and includes identifying an active speaker of a video session; analyzing a signal from an originating endpoint associated with the active speaker; and identifying a target participant with whom the active speaker seeks to interact (e.g., communicate, share information, solicit information from, etc.). The method also includes providing a notification to the target participant that alerts the target participant that the active speaker is seeking to interact with the target participant. In more particular embodiments, the identifying of the target participant includes detecting a gaze of the active speaker, and identifying a target screen to which the gaze is directed.

In more specific implementations, the method may include determining coordinates of a location of the gaze on the target screen; and identifying the target participant, whose image is positioned at the coordinates. Additionally, the method may include determining a target participant's identity by face recognition. In detailed instances, the method may include detecting a speech pattern of the active speaker; and using the speech pattern to identify the target participant. The method may also include detecting a head direction of the active speaker; and using the head direction to identify the target participant. In addition, the method may include generating the notification, and overlaying the notification on a video signal sent to a target endpoint associated with the target participant.

Example Embodiments

Figure 1:
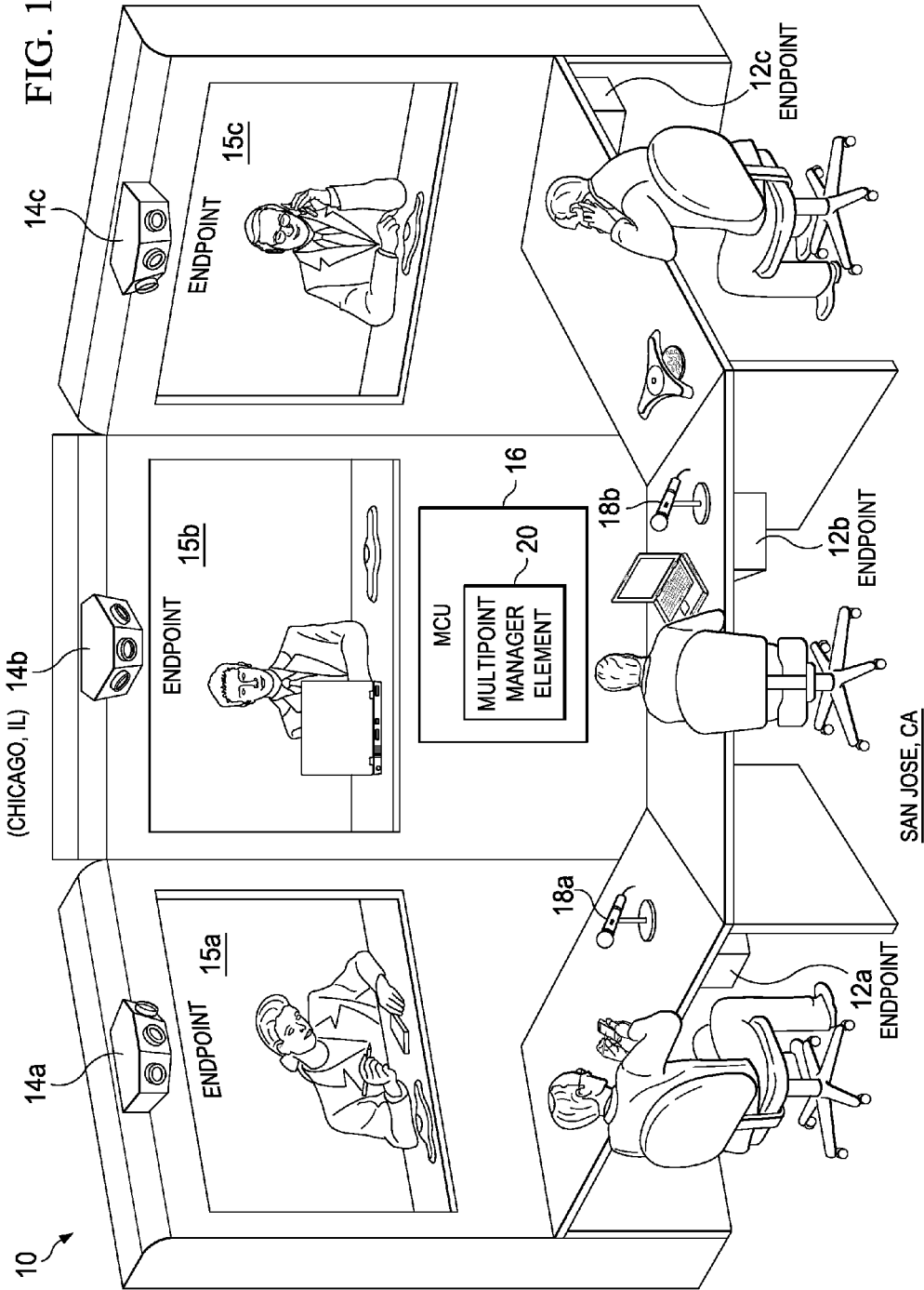
FIG. 1 is a simplified schematic diagram of a system for rendering video data in a communication environment in accordance with one embodiment.

Turning to FIG. 1, FIG. 1 is a simplified schematic diagram illustrating a system 10 configured for providing an alert to a participant of a video conference in accordance with one embodiment of the present disclosure. FIG. 1 includes multiple endpoints, which can be associated with various participants and end users in the video conference. In general, endpoints may be geographically separated, where in this particular example, a set of endpoints 12a-c are located in San Jose, Calif., while a set of counterparty endpoints are located in Chicago, Ill. FIG. 1 includes a multipoint manager element 20 associated with a multipoint control unit (MCU) 16, which can be coupled to endpoints 12a-c. Note that the numerical and letter designations assigned to the endpoints do not connote any type of hierarchy; the designations are arbitrary and have been used for purposes of teaching only. These designations should not be construed in any way to limit their capabilities, functionalities, or applications in the potential environments that may benefit from the features of system 10.

In this example of FIG. 1, each endpoint is fitted discreetly along a desk, where each endpoint is provided proximate to its associated participant. Such endpoints could be provided in any other suitable location, as FIG. 1 only offers one of a multitude of possible implementations for the activities discussed herein. In one example implementation, endpoints 12a-c are video conference endpoints, which can assist in receiving and communicating video and audio data. Other types of endpoints are certainly within the broad scope of the outlined concept, and some of these example endpoints are further described below. Each endpoint 12a-c can be configured to interface with a respective multipoint manager element (e.g., multipoint manager element 20), which can help to coordinate and to process information being transmitted by the participants.

As illustrated in FIG. 1, a number of cameras 14a-c, screens 15a-c, and microphones 18a-b are provided for the conference participants. Screens 15a-c can render images to be seen by the participants and, in this particular example, reflect a three-screen design (e.g., a 'triple'). Note that as used herein in this specification, the term 'screen' is meant to connote any element that is capable of rendering an image during a video conference. This would be inclusive of any panel, display device, Telepresence display or wall, computer display, plasma element, television, monitor, or any other suitable surface or element that is capable of such rendering. Moreover, the screen can encompass each window in a "picture in picture" display on a single display device, where multiple videos or images may be displayed simultaneously, for example, in separate adjacent windows, or in one or more inset windows inside a larger window.

In operation, the video conference technology of system 10 can simulate an in-person meeting experience for its participants. In many conferencing scenarios, not all participants may be visible to an active speaker. The number of remote participants that are viewable to the active speaker at any given time may be limited to a number of local screens available for display in the active speaker's conference room. When the number of remote participants exceeds the number of available screens, any particular remote participant may be unaware that he or she is being viewed by the active speaker and, thus, is unaware that the active speaker's conversation is being directed towards him or her.

In accordance with the teachings of the present disclosure, and to better replicate a true conference room experience, the architecture of system 10 is configured to provide a mechanism for intelligently (and autonomously) rendering images (on video conference displays) of certain participants. Components of system 10 may overlay notifications (i.e., alerts) on appropriate screens to alert participants (e.g., when an active speaker is attempting to converse with a target participant). This can better simulate the experience of a conversation that commonly occurs in an actual conference room.

Note that system 10 is capable of providing on-screen graphics and text overlay to provide visual status updates and to improve the effectiveness and security of the video session. For example, a conference moderator can see when the meeting is locked or is being encrypted from the graphics or text overlay. Graphics and text overlay may have various other uses also, such as menu generation, special effects, assistance for hearing impaired, etc.

System 10 is also capable of switching screens to an active speaker. As used herein, an "active speaker" can refer to a participant who is speaking relatively louder than other participants in the video session at a particular moment of interest, or alternatively, the loudest speaker for a predetermined time interval (e.g., approximately two seconds). If more than one screen is available, one screen may show the active speaker, where the other screens may show the other participants. The active speaker could then readily see the previous active speaker on one of his/her screen(s).

When a video conference has participants from multiple locations, the group of participants may be not displayed on the screen(s). In such a scenario, participants (other than the active speaker) may be displayed randomly. Participants generally do not control which participants are shown on the screen(s). For example, the active speaker may see other participants on his or her screen(s), but the other participants may not realize that they are being shown on the active speaker's screen(s). Such display limitations may negatively affect a meeting experience, for example, when participants do not realize that they are being invited into a conversation (e.g., through physical cues). This stands in contrast to a face-to-face scenario in a group setting, which video conferencing platforms seek to emulate.

More specifically, in the context of face-to-face scenarios in a group setting, people frequently rely on physical cues to recognize when a participant in the group is attempting to converse with a second participant. In this subtle way, physical cues are being used to attract the second participant's attention. The physical cues can include any number of items such as eye gaze, body orientation, hand and arm gestures, facial movements (e.g., raised eyebrows, nodding,), etc. If the target participant (i.e., the person that is a target of the speaker's conversation) is within eyesight, usually, the speaker may direct his/her gaze at the target participant without calling out the target participant's name. On the other hand, if the target participant is not within eyesight, it is likely that the speaker may address the target participant by name.

Participants in a video conference scenario could utilize these same physical cues in the framework of system 10. For example, when the target participant's image is displayed on the active speaker's screen of a single or multi-screen system, the active speaker may address the target participant without calling out the target participant's name. However, in a multipoint video conference (i.e., multiple participants from multiple locations participate in a video conference), the target participant may not realize that the active speaker is attempting to converse with him/her. The target participant may see an image (or video) of the active speaker, similar to all other participants at various endpoints, but the target participant may not realize that the active speaker is conversing with him (to the exclusion of the other participants). The active speaker also may not be aware that the target participant does not realize that he is even being addressed. For example, such a situation can happen frequently in meetings where one of the participants is more active than the other participants.

System 10 is configured to address these issues (and others) in offering a system and method to intelligently and systematically alert a participant in a video session (e.g., a video conference, a video call involving a group, a video chat, a Telepresence call, etc.) about a current (or a potential) interaction. In an example implementation, speech behavior pattern, head direction, and eye gaze of an active speaker may be detected and monitored to determine whether the active speaker is attempting to converse with a target participant, whose image would be displayed on a target screen. For example, when the active speaker stops speaking with a questioning tone, with his head and eyes directed at a target location on a target screen for a certain time interval, then the target participant (whose image is positioned at the target location) may be notified via an appropriate notification (e.g., blinking icon on display, beep, text message, etc.). In addition, a last sentence spoken by the active speaker can be displayed on a screen visible to the target participant. Additionally, system 10 can empower an administrator to control notifications and images (to be rendered on a given set of screens) based on the active speaker's physical cues (e.g., eye gaze, speaker behavior, etc.).

Hence, components of system 10 may analyze the active speaker's visual behavior (e.g., actions or reactions of the active speaker in response to a visual stimulus) to determine the target participant and subsequently alert the target participant appropriately, so as to more closely approximate a face-to-face meeting scenario. In certain example implementations, an active speaker's visual behavior may be analyzed using an ocular tracking system. The ocular tracking system may leverage cameras 14a-c, for example, to detect head direction and gaze of the active speaker. Alternatively, any suitable method for measuring the active speaker's eye movements may be used in the ocular tracking system.

In an example embodiment, video images of the active speaker may be used to extract a position of the active speaker's head and eyes. A camera (e.g., cameras 14a-c) can focus on one or both eyes of the active speaker and, therefore, record their movements as the active speaker looks at the target participant on a target screen (e.g., screen visible to the active speaker, and to which the active speaker has directed his or her gaze). Gaze angles can be measured to determine coordinates of a target location of the active speaker's gaze. The ocular tracking system can detect the target location of the active speaker's gaze (e.g., where the active speaker is looking).

Multipoint manager element 20 can facilitate the analysis of audio and video signals from an originating endpoint (i.e., the active speaker's endpoint where the audio and video signals originated). Additionally, multipoint manager element 20 is configured to identify the target screen to which the gaze is directed and the coordinates of a target location of the gaze on the target screen. Multipoint manager element 20 could have information about which endpoints are currently displayed on the active speaker's screens, an identity of the active speaker, the remote participants who are displayed on the active speaker's screens, etc. In combination with information from the ocular tracking system, multipoint manager element 20 can identify the target participant whose image is positioned at the target location of the active speaker's gaze on the target screen. Having determined the target participant with whom the active speaker is conversing, multipoint manager element 20 may facilitate a display of a notification (i.e., a light indicator, an icon, a text, a proprietary graphic, etc.) on a screen visible to the target participant, thereby alerting the target participant that the active speaker is conversing (or attempting to converse) with him or her.

In certain implementations, a picture-in-picture clue (e.g., active presence for each participant) can be implemented in the architecture of the present disclosure. For example, if system 10 detects that an individual is gazing at user A, then on user A's screen, the PIP can blink to let user A know that the individual is currently looking at him. It should also be noted that the architecture of the present disclosure can also readily handle instances in which a given participant in the video conference is not currently on any screen. This could involve, for example, the initiating individual using a soft button configuration, an instant messaging mechanism, or body movements, facial gestures, eye gazing, etc. to signal an attempted interaction with the target.

Note also that the architecture has the ability to not only notify the remote participant being addressed, but to rearrange local display(s) to override the last active speaker model with the images of the individual being addressed. For example, because of screen arrangements, an individual could be addressing someone on a screen not associated with that individual's camera. The individual may be looking obliquely (or sideways, or to the side) to address the participant: causing a lack of eye contact on both near and far end. System 10 is configured to rearrange participants such that the participant being addressed by the individual is switched to the individual's screen (and vice versa, in certain implementations). Such activities would enable direct eye contact between the participant and the individual. Additional details associated with these activities are provided below with reference to corresponding FIGURES.

Turning to the infrastructure of FIG. 1, the example network environment of FIG. 1 may be configured as one or more networks. Additionally, networks of FIG. 1 may be provisioned in any form including, but not limited to, local area networks (LANs), wireless local area networks (WLANs), virtual local area networks (VLANs), metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. System 10 may include a configuration capable of transmission control protocol/Internet protocol (TCP/IP) communications for the electronic transmission or reception of packets in a network. System 10 may also operate in conjunction with a user datagram protocol/IP (UDP/IP) or any other suitable protocol, where appropriate and based on particular needs. In addition, gateways, routers, switches, and any other suitable network elements may be used to facilitate electronic communication between various elements.

The components of system 10 may use specialized applications and hardware to create a system that can leverage a network. System 10 can use Internet protocol (IP) technology and run on an integrated voice, video, and data network. System 10 can also support high quality, real-time voice, and video communications using broadband connections. The architecture of system 10 can further offer capabilities for ensuring quality of service (QoS), security, reliability, and high availability for high-bandwidth applications such as video. Power and Ethernet connections for participants can also be provided. Participants can use their laptops to access data for the meeting, join a meeting place protocol or a Web session, or stay connected to other applications throughout the meeting Endpoints 12a-c may be used by a participant in a video conference in system 10. The term 'endpoint' may be inclusive of devices used to initiate a communication, such as a switch, a console, a proprietary endpoint, a telephone, a bridge, a computer, a personal digital assistant (PDA), a laptop or electronic notebook, an i-Phone, an iPad, a Google Droid, any other type of smartphone, or any other device, component, element, or object capable of initiating voice, audio, or data exchanges within system 10. Endpoints 12a-c may also be inclusive of a suitable interface to a participant, such as a microphone, a display device, or a keyboard or other terminal equipment. Endpoints 12a-c may also include any device that seeks to initiate a communication on behalf of another entity or element, such as a program, a database, or any other component, device, element, or object capable of initiating a voice or a data exchange within system 10. Data, as used herein, refers to any type of video, numeric, voice, or script data, or any type of source or object code, or any other suitable information in any appropriate format that may be communicated from one point to another.

MCU 16 can be configured to establish, or to foster, a video session between one or more participants, who may be located in various other sites and locations. MCU 16 and multipoint manager element 20 can coordinate and process various policies involving endpoints 12a-c. In general, MCU 16 and multipoint manager element 20 may communicate with endpoints 12a-c through any standard or proprietary conference control protocol. Multipoint manager element 20 includes a switching component that determines which signals are to be routed to individual endpoints 12a-c for rendering on screens. Multipoint manager element 20 can also determine how individual participants are seen by other participants in the video conference. Multipoint manager element 20 can add visual information to video signals sent to target participants. For example, multipoint manager element 20 can generate notifications and send the notifications to target participants (e.g., after mixing and overlaying text messages, audio cues, graphics, etc. on outgoing video signals to the target endpoints). Furthermore, multipoint manager element 20 can control the timing and coordination of these activities. Multipoint manager element 20 can also include a media layer that can copy information or data, which can be subsequently retransmitted or simply forwarded along to one or more endpoints 12a-c.

Figure 2:
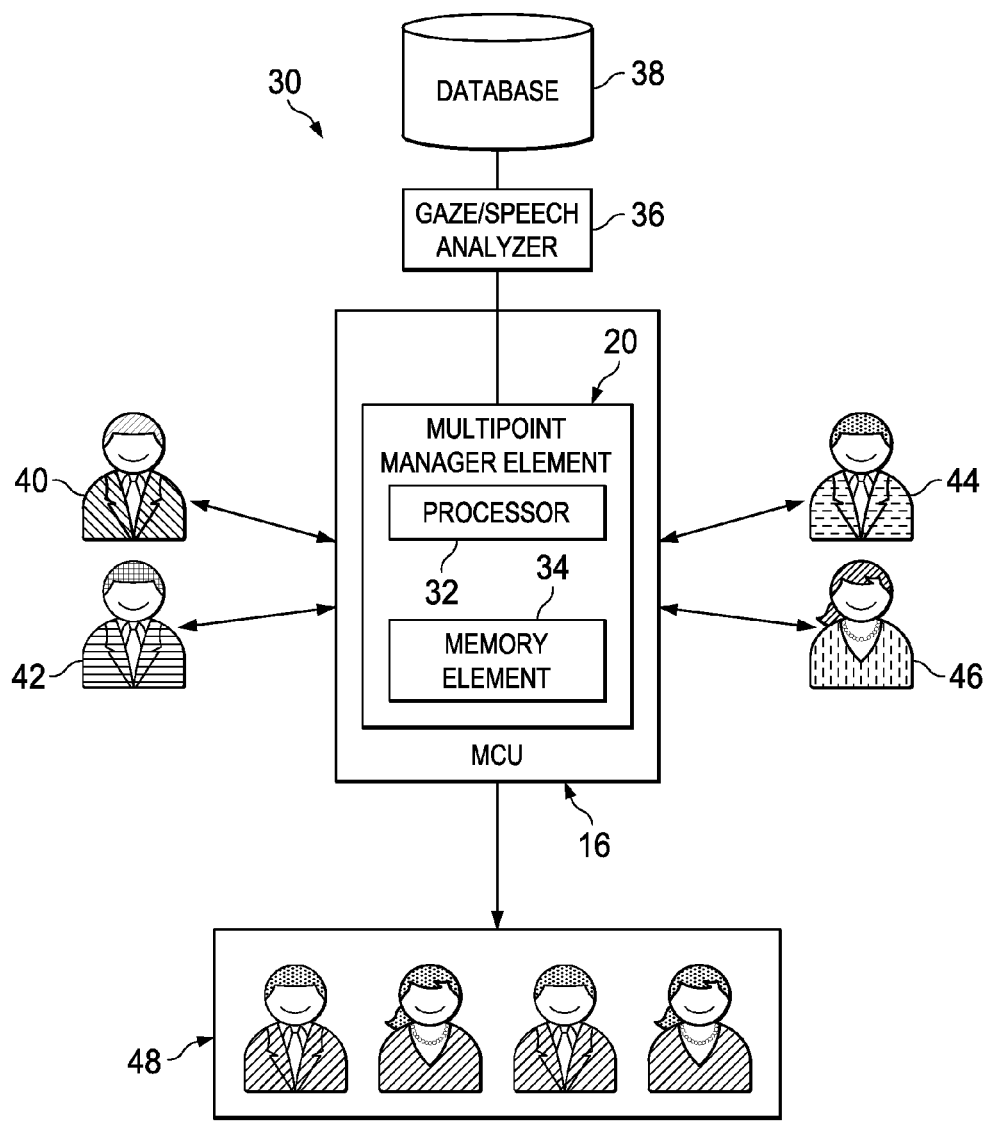
FIG. 2 is a simplified block diagram of example details of the system in accordance with one embodiment.

Turning to FIG. 2, FIG. 2 is a simplified block diagram 30 illustrating example details of system 10 in accordance with one embodiment. Multipoint manager element 20 may be provisioned in MCU 16 and may include a processor 32 and a memory 34. Multipoint manager element 20 may communicate with a gaze/speech analyzer 36, which may access a database 38. Gaze/speech analyzer 36 may receive audio and video signals from multipoint manager element 20. In an example embodiment, gaze/speech analyzer 36 may determine a speech pattern of the active speaker, and use the information as a basis for sending a notification through the architecture.

Speech patterns to be detected can include a distinctive manner of oral expression. For example, the active speaker's tone of voice (e.g., vocative tone) may indicate a question is being asked. Gaze/speech analyzer 36 may analyze the audio signals and determine (from the active speaker's speech pattern) that the active speaker is asking a question. Hence, system 10 can be configured to provide enhanced intelligence that dynamically adjusts its image rendering operations based on vocative speech inputs from the participants. This would enhance the user experience by offering an effective placement of participant images on screens for a multiscreen endpoint. In operation, the architecture of system 10 can utilize speech vocative tone for smarter segment switching. For example, after the name of each participant has been identified and associated to the corresponding camera that captures their video, the speech pattern analysis can be initiated. With a speech pattern detection feature, when a user A addresses a remote user B by his/her name, the speech being emitted is analyzed, and subsequently used to determine the video segment for user A's video display. The video segment shown for user A would contain user B (even though user B is not necessarily speaking).

Hence, the mechanisms of system 10 can use basic speech, words, and/or pattern-recognition to identify a specific name. Once that name is detected, the speech segment containing it can be further analyzed to capture the change in the frequency (e.g., f0 frequency). For example, if the f0 frequency increases and then decreases, the speech portion can be classified as a vocative tone. In a particular implementation, the architecture can detect an H*L pattern (i.e., a falling intonation). As used herein in this Specification, the broad term 'vocative parameter' is meant to encompass any suitable vocative characteristic, as detailed herein. More generally, the vocative detection mechanisms of system 10 can apply to the case of a noun identifying a person (animal, object, etc.) being addressed and/or (occasionally) the determiners of that noun. A vocative expression can be an expression of direct address, where the identity of the party being addressed is set forth expressly within a sentence. For example, in the sentence "I don't know, John", the term 'John' is a vocative expression indicating the party who is being addressed. This is in contrast to the sentence "I don't know John", where John is the direct object of the verb 'know.' The phonetic manifestation of an L* tone on the final vocative is indicative of its contrastive behavior.

When the active speaker addresses a target participant by name, this can be identified by gaze/speech analyzer 36. Note that certain user information may be populated in gaze/speech analyzer 36 and/or database 38. This user information may include user IDs, names, user profiles, policies to be applied for particular video conferencing arrangements, user preferences, organizational titles, speech patterns associated with individuals, linguistic information, any suitable identifier, etc. Moreover, gaze/speech analyzer 36 may be configured to detect sounds, syllables, tone, etc. in the context of detecting and analyzing speech patterns. Gaze/speech analyzer 36 may include any appropriate combination of hardware and/or software modules for providing any of the features discussed herein.

In an example embodiment, gaze/speech analyzer 36 may detect a gaze of the active speaker. For example, gaze/speech analyzer 36 may analyze video signals during the video conference and determine that the active speaker is staring (somewhat continually) at a target location for a period of time (e.g., two to three seconds). Gaze/speech analyzer 36 may be configured to inform multipoint manager element 20 that the active speaker's gaze is detected. Multipoint manager element 20 may also analyze the video signals further to determine coordinates of the target location of the gaze. In another example embodiment, gaze/speech analyzer 36 may detect the gaze and determine coordinates of the target location of the active speaker's gaze. Gaze/speech analyzer 36 may then return the coordinates to multipoint manager element 20.

In an example embodiment, gaze/speech analyzer 36 may be part of an ocular tracking system that measures the target location of a gaze of the active speaker. Logistically, gaze/speech analyzer 36 could be implemented as a computer application on a non-transitory computer readable medium. In certain example implementations, gaze/speech analyzer 36 can be implemented in MCU 16. In yet another example embodiment, gaze/speech analyzer 36 may be part of multipoint manager element 20. In yet another example embodiments, gaze/speech analyzer 36 may be located on one or more of the endpoints, or on a device that is accessible by multipoint manager element 20 (e.g., over a network connection). Various other potential implementations of gaze/speech analyzer 36 may be employed without departing from the broad scope of the present disclosure.

Database 38 may include information about the identity of participants 40-48; locations of corresponding endpoints; number of screens at respective endpoints of participants 40-48; profiles of participants 40-48, policies associated with participants 40-48, references associated with a particular host, administrator, or of participants 40-48, and any other information that may be used by gaze/speech analyzer 36, an administrator, and/or multipoint manager element 20 to perform the intended functionality of system 10, as described herein. Database 38 may be provisioned internally within multipoint manager element 20, outside multipoint manager element 20 (e.g., in a network device coupled to multipoint manager element 20), or locally at a particular network location, which could foster communications with multipoint manager element 20 and/or gaze/speech analyzer 36.

In a particular implementation, multipoint manager element 20 is a server provisioned to perform the activities discussed herein. More generally, multipoint manager element 20, MCU 16, and/or gaze/speech analyzer 36 are network elements, where the term "network element" is meant to encompass computers, network appliances, servers, routers, switches, gateways, bridges, load balancers, firewalls, processors, modules, software applications, or any other suitable device, component, element, or object operable to exchange information in a network environment. Moreover, the network elements may include any suitable hardware, software, components, modules, interfaces, or objects that facilitate the operations thereof. It is imperative to note that multipoint manager element 20, MCU 16, and/or gaze/speech analyzer 36 can be consolidated, rearranged, and/or provisioned within each other in any suitable arrangement without departing from the scope of the present disclosure.

Figure 3A:
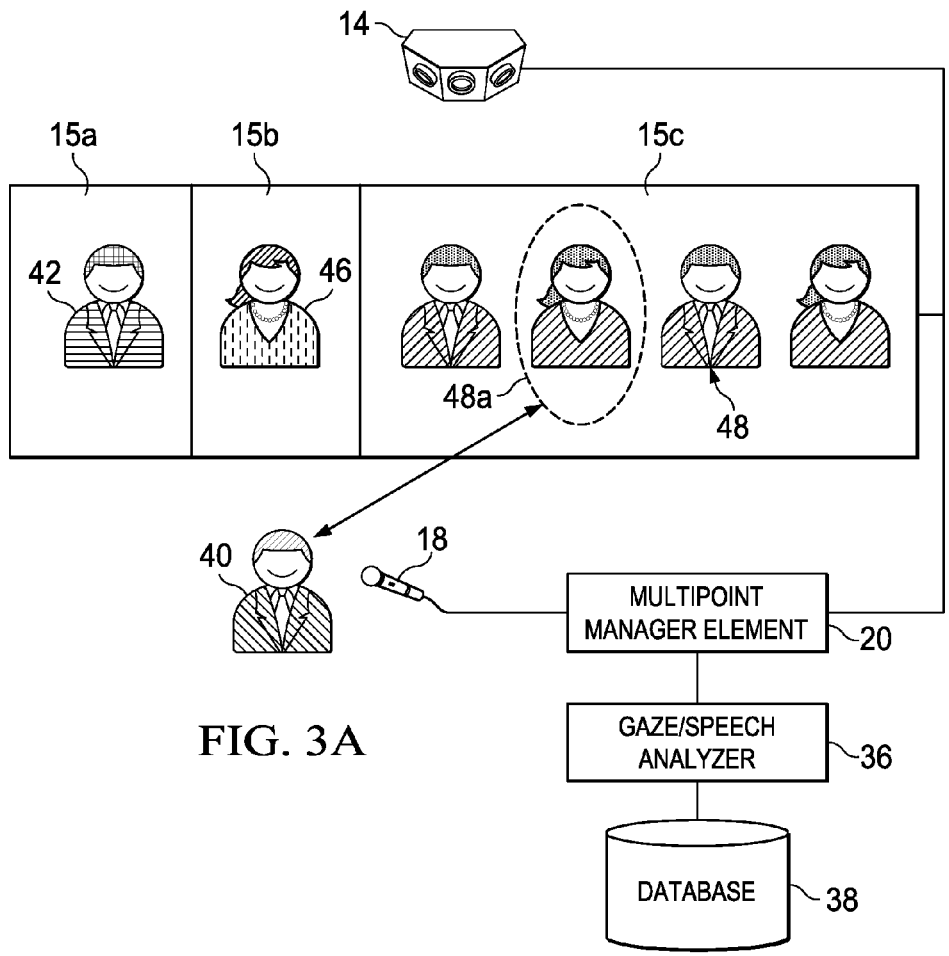
FIG. 3A is a simplified block diagram of an embodiment of the system according to the present disclosure.
Figure 3B:
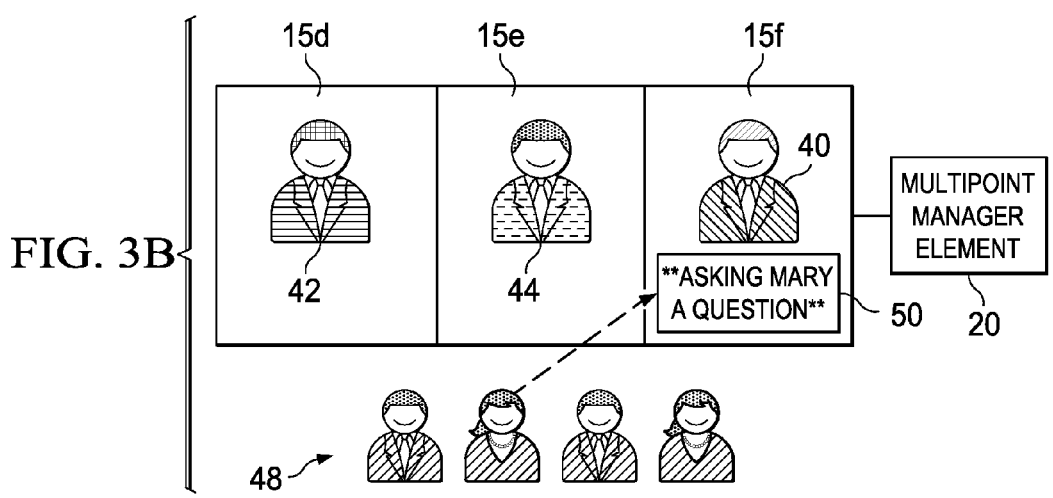
FIG. 3B is a simplified block diagram showing an example view of an embodiment of the system.

Turning to FIGS. 3A and 3B, FIG. 3A a simplified block diagram of an example configuration associated with system 10. In this particular example, participant 40 is currently the active speaker in a video conference. A microphone 18 and a video camera 14 at an originating endpoint (corresponding to the active speaker: participant 40) may record audio and video signals from participant 40. Participant 40 may see participant 42 on screen 15a, participant 46 on screen 15b, and participants 48 on screen 15c. In this particular example, an assumption is made that participant 40 is conversing with participant 48a ("Mary") on screen 15c. Participant 48a is a target participant, where screen 15c is a target screen in this example. Participant 40 may direct his gaze at target screen 15c and (as he speaks) fix his gaze on target participant 48a: located at a target location (with corresponding coordinates $L_{(x,y,z)}$) on target screen 15c.

Multipoint manager element 20 may continuously receive audio and video signals from microphone 18 and video camera 14. In an example embodiment, gaze/speech analyzer 36 may analyze the audio and video signals and determine that participant 40 is directing his gaze at coordinates $L_{(x,y,z)}$. In another example embodiment, gaze/speech analyzer 36 may detect a gaze of participant 40 and inform multipoint manager element 20 that this gaze is being detected. Multipoint manager element 20 may further analyze the video signals and determine that participant 40 is directing his gaze at coordinates $L_{(x,y,z)}$. In one embodiment, gaze/speech analyzer 36 may also determine from a speech pattern of participant 40 that a question is being asked of "Mary" (e.g., if participant 40 addresses "Mary" in his speech).

In an example embodiment, multipoint manager element 20 may access information from database 38 and determine that coordinates $L_{(x,y,z)}$ correspond to a target location, where an image of target participant 48a is displayed on target screen 15c. Multipoint manager element 20 may recognize that a target endpoint corresponding to participants 48 is being displayed on target screen 15c. Multipoint manager element 20 may determine from incoming signals (received from the target endpoint) that an image of target participant 48a is located at the target location on target screen 15c. Multipoint manager element 20 may also identify that target participant 48a corresponds to Mary. For example, database 38 may include identities of participants 48. In another example embodiment, multipoint manager element 20 may employ face recognition methods (e.g., using suitable face recognition modules and/or other elements) to identify individual participants being displayed on target screen 15c, as well as their relative locations thereon. In an example embodiment, a face recognition method may include one or more computer applications for automatically identifying or verifying a person's identity from a video frame (e.g., from a video source). For example, selected facial features from the video frame may be compared with facial features stored in a database (e.g., database 38).

Multipoint manager element 20 may generate any suitable notification that alerts participant 48a that participant 40 is speaking to her. As used herein in this Specification, the term 'notification' includes any suitable visual, audio, textual information. Such notifications may include a text message (e.g., an instant message), a blinking light, a colored light, any illumination feature, a muted sound, a beep, a proprietary sound, a vibration, an icon, a text, a symbol, an avatar, an e-mail address, a picture, a proprietary graphic, or any other suitable notification that is conducive to alerting a given participant in a video conference. The multipoint manager element 20 is also configured to mix and overlay the notification on an outgoing video signal, and subsequently send the outgoing video signals to the target endpoint. The notification may be displayed on one or more screens, which are visible to target participant 48a.

FIG. 3B is a simplified block diagram showing another configuration for the system of the present disclosure. FIG. 3B illustrates the video conference from a perspective of participants 48. Participants 48 may see participant 42 displayed on a screen 15d, participant 44 displayed on a screen 15e, and participant 40 (who is the active speaker in this example scenario) displayed on screen 15f. Screens 15d-f are visible to participants 48, including target participant 48a. Multipoint manager element 20 may facilitate a display of a notification 50 (e.g., text message, "Asking Mary a Question") on screen 15f. In this example, notification 50 includes a beep, a blinking icon on screen 15f, and a text message that alerts target participant 48a that the active speaker is speaking to her. In certain embodiments, notification 50 may include a textual rendering of a last sentence spoken by the active speaker.

In a particular implementation, notification 50 may be displayed on screen 15f to the exclusion of screens 15d and 15e. In another example embodiment, notification 50 may be displayed on all three screens 15d-f simultaneously. Participant 48a may be alerted to the question, and have an opportunity to respond. When participant 48a responds, she becomes an active speaker in this paradigm, and the process may be restarted, for example, by analyzing audio and video signals from the endpoint corresponding to participant 48a.

Figure 4:
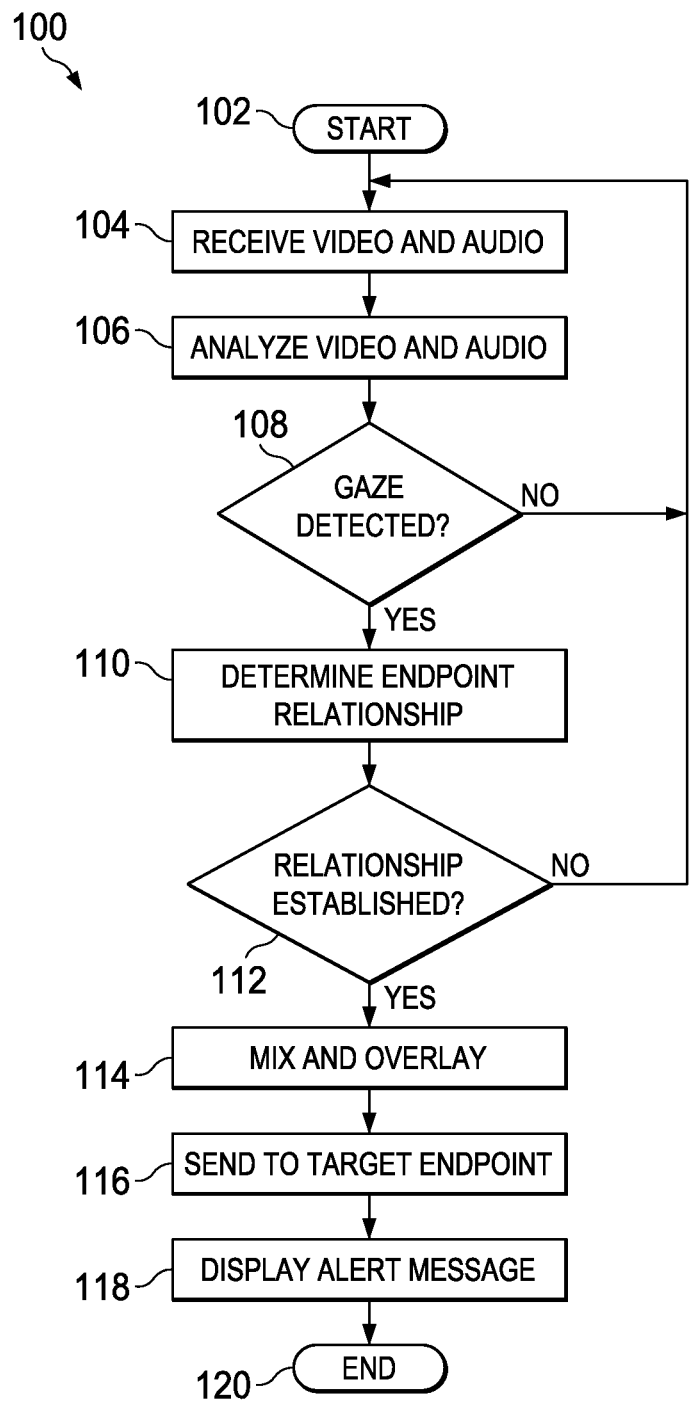
FIG. 4 is a simplified flowchart illustrating example operations associated with an embodiment of the system.

Turning to FIG. 4, FIG. 4 is a simplified flowchart illustrating example operational activities 100 associated with embodiments of the present disclosure. The particular flow of FIG. 4 may begin at 102, when multipoint manager element 20 is activated. In 104, multipoint manager element 20 may receive video and audio signals from an originating endpoint corresponding to the active speaker. In 106, gaze/speech analyzer 36 may analyze the video and audio signals. In 108, a determination can be made whether a gaze is detected. For example, if the active speaker is looking at no one particular participant, a gaze may not be detected, in which case, the process may revert to 104. However, if the video signals indicate that the active speaker is directing his gaze to a target location on a target screen, and the target location corresponds to a target participant, then a gaze may be detected.

If a gaze is detected, an endpoint relationship may be determined in 110. As used herein, an "endpoint relationship" encompasses a relationship between a target location of the gaze on a target screen and a target participant positioned at the target location. In an example embodiment, gaze/speech analyzer 36 can be configured to provide (or at least assist) the determination. In another example embodiment, multipoint manager element 20 may independently make the determination. Multipoint manager element 20 may identify a target screen to which the gaze is directed, and determine a target endpoint displayed on the target screen. Coordinates of the target location of the gaze on the target screen may also be determined. In an example embodiment, gaze/speech analyzer 36 may return the coordinates of the target location to multipoint manager element 20 based on video signals from one or more cameras in the active speaker's conference room. Multipoint manager element 20 may identify the target participant whose image is positioned at the coordinates.

In 114, multipoint manager element 20 may mix and overlay notification 50 on an outgoing video signal to the target endpoint. In 116, the outgoing video signal may be sent to the target endpoint. Notification 50 may be displayed on one or more screens visible to the target participant in 118. The process may end in 120, where similar operations can be repeated for subsequent flows (e.g., when the active speaker changes).

In example implementations, at least some portions of the activities related to alerting a participant in a video conference outlined herein may be implemented in software in, for example, gaze/speech analyzer 36 and/or multipoint manager element 20. In some embodiments, one or more of these features may be implemented in hardware, provided external to these elements, or consolidated in any appropriate manner to achieve the intended functionality. MCU 16, gaze/speech analyzer 36, and/or multipoint manager element 20 may include software (or reciprocating software) that can coordinate in order to achieve the operations, as discussed herein. In still other embodiments, these elements may include any suitable algorithms, hardware, software, components, modules, interfaces, or objects that facilitate the operations thereof. In addition, MCU 16 and/or multipoint manager element 20 described and shown herein (and/or their associated structures) may also include suitable interfaces for receiving, transmitting, and/or otherwise communicating data or information in a network environment.

In some of example embodiments, one or more memory elements (e.g., memory element 34) can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, processor 32 could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in system 10 can include one or more memory elements (e.g., memory element 34) for storing information to be used in achieving the operations as outlined herein. These devices may further keep information in any suitable type of memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

Additionally, some of the processors and memory elements associated with the various network elements may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of network elements. It should be appreciated that system 10 of the FIGURES and its teachings are readily scalable and can accommodate a large number of components, as well as more complicated/sophisticated arrangements and configurations. Accordingly, the examples provided should not limit the scope or inhibit the broad teachings of system 10 as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, system 10 may be applicable to other exchanges or routing protocols. Moreover, although system 10 has been illustrated with reference to particular elements and operations that facilitate the communication process, these elements and operations may be replaced by any suitable architecture or process that achieves the intended functionality of system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    identifying an active speaker of a video session;
    detecting a gaze of the active speaker;
    determining a target screen to which the gaze is directed;
    determining coordinates of a target location of the gaze on the target screen;
    identifying a target participant whose image is positioned at the target location of the gaze of the active speaker; and
    providing a notification to the target participant that alerts the target participant that the active speaker is seeking to interact with the target participant.

2. The method of claim 1, wherein the detecting the gaze includes determining that the active speaker stares at a location for a period of time.

3. The method of claim 1, wherein the determining coordinates of the target location includes measuring gaze angles.

4. The method of claim 1, further comprising:
    determining a target participant's identity by face recognition.

5. A method comprising:
    identifying an active speaker of a video session;
    detecting a speech pattern of the active speaker;
    identifying a target participant with whom the active speaker seeks to interact using the speech pattern; and
    providing a notification to the target participant that alerts the target participant that the active speaker is seeking to interact with the target participant.

6. A method comprising:
    identifying an active speaker of a video session;
    detecting a head direction of the active speaker; and
    identifying a target participant with whom the active speaker seeks to interact using the head direction; and
    providing a notification to the target participant that alerts the target participant that the active speaker is seeking to interact with the target participant.

7. The method of claim 1, further comprising
    generating the notification; and
    overlaying the notification on a video signal sent to a target endpoint associated with the target participant.

8. The method of claim 1, wherein the notification comprises a selected one of a group of notifications, the group consisting of:
    a) a blinking icon provided on a screen;
    b) an audible sound provided for an endpoint;
    c) a text message provided on a screen;
    d) a textual rendering of a sentence spoken by the active speaker and provided on a screen;
    e) a graphic provided on a screen;
    f) an avatar provided on a screen; and
    g) a vibration provided for an endpoint.

9. Logic encoded in non-transitory media that includes code for execution and when executed by a processor operable to perform operations, comprising:
    identifying an active speaker of a video session;
    detecting a gaze of the active speaker;
    determining a target screen to which the gaze is directed;
    determining coordinates of a target location of the gaze on the target screen;
    identifying a target participant whose image is positioned at the target location of the gaze of the active speaker; and
    providing a notification to the target participant that alerts the target participant that the active speaker is seeking to interact with the target participant.

10. The logic of claim 9, wherein the detecting the gaze includes determining that the active speaker stares at a location for a period of time.

11. The logic of claim 9, wherein the determining coordinates of the target location includes measuring gaze angles.

12. The logic of claim 9, the operations further comprising:
    determining a target participant's identity by face recognition.

13. Logic encoded in non-transitory media that includes code for execution and when executed by a processor operable to perform operations, comprising:
    identifying an active speaker of a video session;
    detecting a speech pattern of the active speaker;
    identifying a target participant with whom the active speaker seeks to interact using the speech pattern; and
    providing a notification to the target participant that alerts the target participant that the active speaker is seeking to interact with the target participant.

14. Logic encoded in non-transitory media that includes code for execution and when executed by a processor operable to perform operations, comprising:
    identifying an active speaker of a video session;
    detecting a head direction of the active speaker; and
    identifying a target participant with whom the active speaker seeks to interact using the head direction; and
    providing a notification to the target participant that alerts the target participant that the active speaker is seeking to interact with the target participant.

15. The logic of claim 9, the operations further comprising:
    generating the notification; and
    overlaying the notification on a video signal sent to a target endpoint associated with the target participant.

16. An apparatus, comprising:
    a memory element for storing data; and
    a processor operable to execute instructions associated with the data, wherein the processor and the memory element cooperate, such that the apparatus is configured for:
        identifying an active speaker of a video session;
        detecting a speech pattern and/or a head direction of the active speaker;

identifying a target participant with whom the active speaker seeks to interact using the speech pattern and/or a head direction; and providing a notification to the target participant that alerts the target participant that the active speaker is seeking to interact with the target participant.

17. An apparatus, comprising:

a memory element for storing data and a processor operable to execute instructions associated with the data, wherein the processor and memory element cooperate, such that the apparatus is configured for:

identifying an active speaker of a video session;

detecting a gaze of the active speaker, and identifying a target screen to which the gaze is directed, determining coordinates of a target location of the gaze on the target screen, identifying a target participant whose image is positioned at the target location of the gaze of the active speaker, and providing a notification to the target participant that alerts the target participant that the active speaker is seeking to interact with the target participant.

18. The apparatus of claim 17, wherein the detecting the gaze includes determining that the active speaker stares at a location for a period of time.

19. The apparatus of claim 16, the apparatus being further configured for:

generating the notification; and overlaying the notification on a video signal sent to a target endpoint associated with the target participant.

20. The apparatus of claim 16, further comprising:

a database configured for storing:

information associated with an identity of the target participant; and information associated with a target endpoint corresponding to the target participant.

* * * * *